(12) United States Patent
Zhang et al.

(10) Patent No.: US 12,457,336 B2
(45) Date of Patent: Oct. 28, 2025

(54) BOUNDARY HANDLING FOR CODING TREE SPLIT

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 80 days.

(21) Appl. No.: 18/486,375

(22) Filed: Oct. 13, 2023

(65) Prior Publication Data

US 2024/0048701 A1    Feb. 8, 2024

Related U.S. Application Data

(63) Continuation of application No. PCT/CN2022/086519, filed on Apr. 13, 2022.

(30) Foreign Application Priority Data

Apr. 13, 2021 (WO) ................ PCT/CN2021/086867

(51) Int. Cl.
*H04N 19/119* (2014.01)
*H04N 19/167* (2014.01)
(Continued)

(52) U.S. Cl.
CPC ......... *H04N 19/119* (2014.11); *H04N 19/167* (2014.11); *H04N 19/176* (2014.11); *H04N 19/70* (2014.11); *H04N 19/96* (2014.11)

(58) Field of Classification Search
CPC .............. H04N 19/119; H04N 19/167; H04N 19/176; H04N 19/70; H04N 19/96
(Continued)

(56) References Cited

U.S. PATENT DOCUMENTS

| 2012/0114261 A1* | 5/2012 | Cheon | H04N 19/395 |
| | | | 382/239 |
| 2014/0294084 A1* | 10/2014 | Cheon | H04N 19/122 |
| | | | 375/240.16 |

(Continued)

FOREIGN PATENT DOCUMENTS

| CN | 104796710 A | 7/2015 |
| CN | 110636314 A | 12/2019 |

(Continued)

OTHER PUBLICATIONS

Chen et al., The Joint Exploration Model (JEM) for Video Compression with Capability Beyond HEVC, IEEE, vol. 30, No. 5, May 2020 (Year: 2020).*

(Continued)

*Primary Examiner* — Marnie A Matt
(74) *Attorney, Agent, or Firm* — Conley Rose, P.C.

(57) ABSTRACT

Systems, methods, and an apparatus for video processing are described. A video processing method includes determining an application of a partitioning scheme to a video block positioned at a boundary of a video unit based on a rule, and performing a conversion between a visual media data and a bitstream based on the application of the partitioning scheme to the video block.

20 Claims, 14 Drawing Sheets

(51) Int. Cl.
*H04N 19/176* (2014.01)
*H04N 19/70* (2014.01)
*H04N 19/96* (2014.01)

(58) Field of Classification Search
USPC .................................................. 375/240.24
See application file for complete search history.

(56) References Cited

U.S. PATENT DOCUMENTS

| | | | |
|---|---|---|---|
| 2015/0358640 A1* | 12/2015 | Hendry | H04N 19/61 375/240.13 |
| 2019/0313129 A1* | 10/2019 | Lee | H04N 19/174 |
| 2020/0145698 A1* | 5/2020 | Gao | H04N 19/119 |
| 2020/0195924 A1* | 6/2020 | Hsiang | H04N 19/167 |
| 2021/0014490 A1* | 1/2021 | Wieckowski | H04N 19/176 |
| 2021/0092377 A1* | 3/2021 | Zhang | H04N 19/119 |
| 2021/0112284 A1* | 4/2021 | Zhang | H04N 19/132 |

FOREIGN PATENT DOCUMENTS

| | | |
|---|---|---|
| CN | 110839161 A | 2/2020 |
| CN | 110999297 A | 4/2020 |
| CN | 112204968 A | 1/2021 |
| JP | 2020526145 A | 8/2020 |
| WO | 2016091161 A1 | 6/2016 |
| WO | 2020156572 A1 | 8/2020 |
| WO | 2022171071 A1 | 8/2022 |
| WO | 2022174769 A1 | 8/2022 |

OTHER PUBLICATIONS

Document: JVET-K0287-v1, Gao, H., et al., "CE1-2.0.11: Picture Boundary Handling," Joint Video Experts Team (JVET) of ITU-T SG 16 WP 3 and ISO/IEC JTC 1/SC 29/WG 11 11th Meeting: Ljubljana, SI, Jul. 10-18, 2018, 7 pages.

Retrieved from the internet: http://www.avs.org.cn/english/, Jan. 9, 2024, 3 pages.

Sullivan, G., et al., "Overview of the High Efficiency Video Coding (HEVC) Standard," IEEE Transactions on Circuits and Systems for Video Technology, vol. 22, No. 12, Dec. 2012, 20 pages.

Luthra, A., et al., "Overview of the H.264/AVC video coding standard", Proceedings of SPIE vol. 5203 Applications of Digital Image Processing XXVI, Nov. 19, 2003, 16 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

JEM-7.0, Retrieved from the internet: https://jvet.hhi.fraunhofer.de/svn/svn_HMJEMSoftware/tags/HM-16.6-JEM-7.0, Jan. 9, 2024, 1 page.

"Series H: Audiovisual and Multimedia Systems Infrastructure of audiovisual services—Coding of moving video High efficiency video coding," Recommendation ITU-T H.265, Aug. 2021, 716 pages.

Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.

Retrieved from the internet: Patent for binary tree:https://patentscope.wipo.int/search/en/detail.jsf;jsessionid=B6F96E719C3DECA6BB5B0830F82F2478.wapp1nCdocId=WO2016091161 recNum=1 maxRec= office=prevFilter= sortOption= queryString= tab=FullText#fig0004, Jan. 9, 2024, 7 pages.

Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.

Budagavi, M., et al., "Core Transform Design for the High Efficiency Video Coding (HEVC) Standard," IEEE Journal of Selected Topics in Signal Processing, vol. 7, No. 6, Dec. 2013, 13 pages.

International Search Report from PCT Application No. PCT/CN2022/086519 dated Jul. 4, 2022, 12 pages.

* cited by examiner

BOUNDARY HANDLING FOR CODING TREE SPLIT

CROSS-REFERENCE TO RELATED APPLICATIONS

This application is a continuation of International Patent Application No. PCT/CN2022/086519, filed on Apr. 13, 2022, which claims the priority to and benefit of International Patent Application No. PCT/CN2021/086867 filed on Apr. 13, 2021. All the aforementioned patent applications are hereby incorporated by reference in their entireties.

TECHNICAL FIELD

The present disclosure relates to generation, storage, and consumption of digital audio and video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising determining an application of a partitioning scheme to a video block positioned at a boundary of a video unit based on a rule, and performing a conversion between a visual media data and a bitstream based on the application of the partitioning scheme to the video block.

Optionally, in any of the preceding aspects, another implementation of the aspect provides that when the application of the partitioning scheme to the video unit results in at least a portion of the video block being positioned outside the boundary of the video unit, wherein the rule indicates that the portion of the video block positioned outside the boundary of the video unit is to be discarded, and wherein the method further comprises discarding the portion of the video block positioned outside the boundary of the video unit after applying the partitioning scheme to the video unit.

Optionally, in any of the preceding aspects, another implementation of the aspect provides that the rule indicates whether the partitioning scheme is allowed to be used on the video block at the boundary based on at least one of a location of the video block or a location of the boundary.

Optionally, in any of the preceding aspects, another implementation of the aspect provides that the rule indicates whether the partitioning scheme is allowed to be used on the video block at the boundary based on at least one of dimensions of the video block or dimensions of a sub-block of the video block, and wherein the sub-block of the video block is partitioned from the video block.

Optionally, in any of the preceding aspects, another implementation of the aspect provides that the rule indicates that the partitioning scheme is allowed to be used to partition the video block when the application of the partitioning scheme to the video block results in a plurality of sub-blocks, wherein a first subset of the plurality of sub-blocks are outside the boundary of the video unit, the rule indicates that a horizontal partitioning scheme is allowed to be used to partition the video block when the boundary is at least one of a bottom boundary or corner boundary of the video unit and when the application of the horizontal partitioning scheme to the video block results in the plurality of sub-blocks, wherein a sum of heights of a second subset of the plurality of sub-blocks within the boundary of the video unit is equal to a difference between a height of the video unit and a y-coordinate of the video block, the rule indicates that a vertical partitioning scheme is allowed to be used to partition the video block when the boundary is at least one of a right boundary or the corner boundary of the video unit and when the application of the vertical partitioning scheme to the video block results in the plurality of sub-blocks, wherein a sum of widths of the second subset of the plurality of sub-blocks within the boundary of the video unit is equal to a difference between a width of the video unit and an x-coordinate of the video block, the rule indicates that the horizontal partitioning scheme is allowed to be used to partition the video block when the video block is at the corner boundary of the video unit and when the application of the horizontal partitioning scheme to the video block results in the plurality of sub-blocks, wherein the sum of heights of the second subset of the plurality of sub-blocks within the boundary of the video unit is equal to the difference between the height of the video unit and the y-coordinate of the video block, and the rule indicates that the vertical partitioning scheme is allowed to be used to partition the video block when the video block is at the corner boundary of the video unit and when the application of the vertical partitioning scheme to the video block results in the plurality of sub-blocks, wherein the sum of widths of the second subset of the plurality of sub-blocks within the boundary of the video unit is equal to the difference between the width of the video unit and the x-coordinate of the video block.

Optionally, in any of the preceding aspects, another implementation of the aspect provides that the rule indicates that the partitioning scheme is disallowed to be used to partition the video block when the video block is positioned at the boundary of the video unit, and wherein the bitstream excludes an indication of the partitioning scheme when the partitioning scheme is disallowed to be used to partition the video block.

Optionally, in any of the preceding aspects, another implementation of the aspect provides that the rule indicates whether the partitioning scheme is allowed to be used on the video block at the boundary based on at least one of a width of the video block, a height of the video block, or a depth of the video block.

Optionally, in any of the preceding aspects, another implementation of the aspect provides that the rule indicates whether the partitioning scheme is allowed to be used on the video block at the boundary based on a comparison between a threshold and at least one of a width of the video block, a height of the video block, or a depth of the video block.

Optionally, in any of the preceding aspects, another implementation of the aspect provides that the threshold is based on at least one of a color component of the video block, a slice type of the video block, a picture type of the video block, a luma coding tree of the video block, or a chroma coding tree of the video block.

Optionally, in any of the preceding aspects, another implementation of the aspect provides that the bitstream comprises an indication of the threshold.

Optionally, in any of the preceding aspects, another implementation of the aspect provides that the rule is based on coding information of the video block.

Optionally, in any of the preceding aspects, another implementation of the aspect provides that the coding information comprises at least one of a color format of the video block or a color component of the video block, and wherein the rule is further based on whether a luma coding tree and a chroma coding tree of the video block are separated.

Optionally, in any of the preceding aspects, another implementation of the aspect provides that the bitstream comprises an indication of whether the partitioning scheme is allowed to be used on the video block.

Optionally, in any of the preceding aspects, another implementation of the aspect provides that the bitstream comprises an indication of the partitioning scheme allowed to be used on the video block.

Optionally, in any of the preceding aspects, another implementation of the aspect provides that the rule indicates whether the partitioning scheme is allowed to be used on the video block at the boundary based on at least one of a picture type of the video block, a slice type of the video block, an intra-coded slice (I-slice) of the video block, a unidirectional inter prediction slice (P-slice) of the video block, a inter prediction slice (B-slice) of the video block, a temporal layer of the of the video block, a color component of the video block, or a color format of the video block.

Optionally, in any of the preceding aspects, another implementation of the aspect provides that the bitstream excludes a syntax element indicating whether the partitioning scheme is allowed to be used on the video block when the partitioning scheme is disallowed from being used to partition the video block.

Optionally, in any of the preceding aspects, another implementation of the aspect provides that the bitstream excludes information regarding any partitioning scheme when only one partitioning scheme is allowed to be used on the video block.

Optionally, in any of the preceding aspects, another implementation of the aspect provides that a binarization of syntax elements related to partitioning schemes is based on whether one or a plurality of partitioning schemes are allowed to be used to partition the video block.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

A fourth aspect relates to a non-transitory computer-readable recording medium storing a bitstream of a video which is generated by a method performed by a video processing apparatus, wherein the method comprises determining an application of a partitioning scheme to a video block positioned at a boundary of a video unit based on a rule, and generating the bitstream based on the determining of the application of the partitioning scheme to the video block positioned at the boundary of the video unit.

A fifth aspect relates to a method for storing bitstream of a video, comprising determining an application of a partitioning scheme to a video block positioned at a boundary of a video unit based on a rule, generating the bitstream based on the application of the partitioning scheme to the video block positioned at the boundary of the video unit, and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to the text by bold italics indicating cancelled text and bold underline indicating added text, with respect to the VVC specification or International Organization for Standardization (ISO) base media file format (ISOBMFF) file format specification.

This document is related to image/video coding, and more particularly to transforms on some special kinds of blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
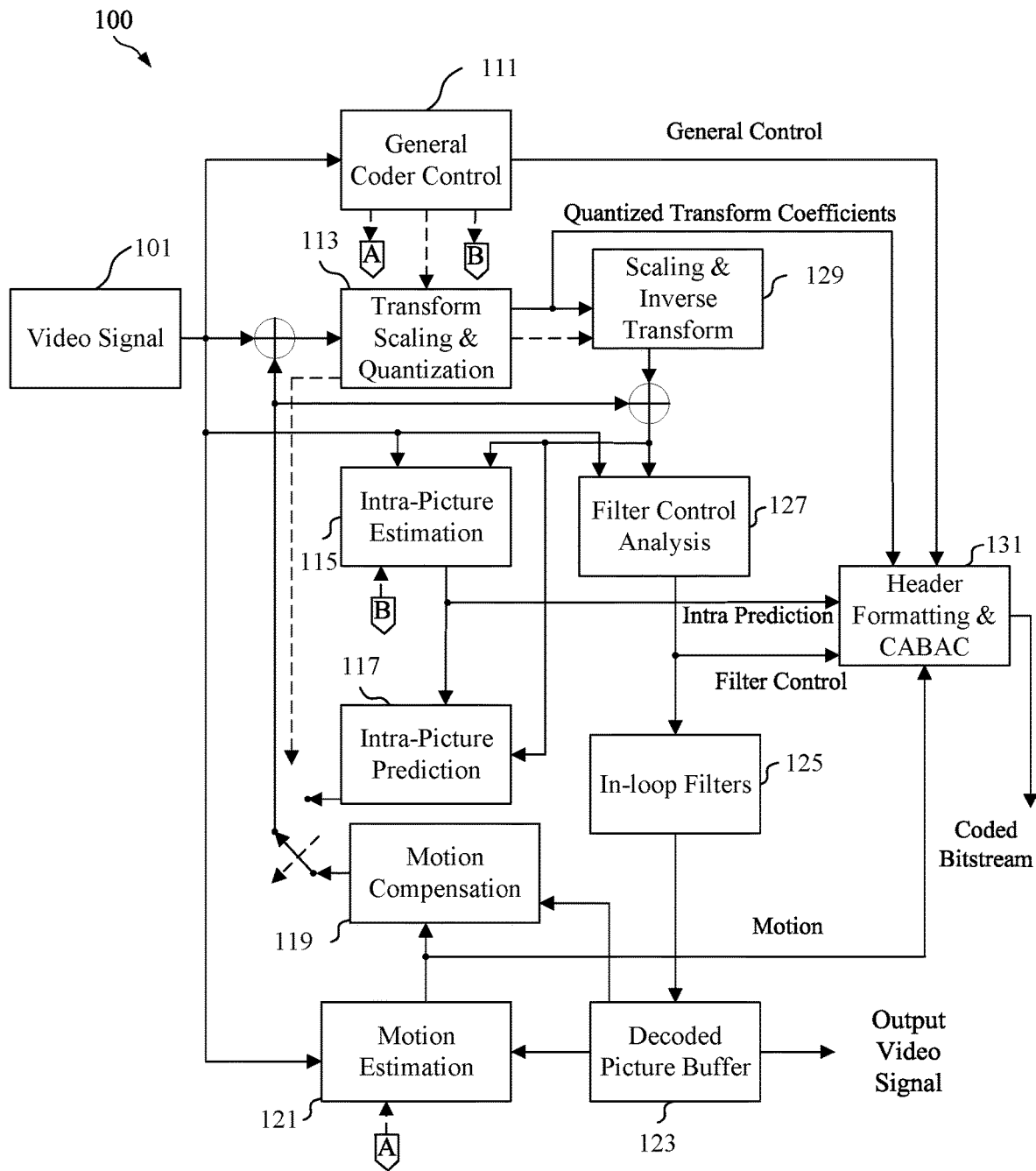
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a coding tree unit (CTU) that contains a luma block, red difference chroma (Cr) block(s), and a blue difference chroma (Cb) block(s) along with corresponding syntax instructions for the CU. The split modes may include a binary tree (BT), a triple tree (TT), and a quadtree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and context-adaptive binary arithmetic coding (CABAC) component 131 to be encoded in the bitstream to signal parameters for decoding at the decoder.

The video signal 101 is also sent to the motion estimation component 121 and the motion compensation component 119 for inter-prediction. A video unit (e.g., a picture, a slice, a CTU, etc.) of the video signal 101 may be divided into multiple blocks. Motion estimation component 121 and the motion compensation component 119 perform inter-predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, video codec 100 may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter-prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a sample adaptive offset (SAO) filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of the most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 2:
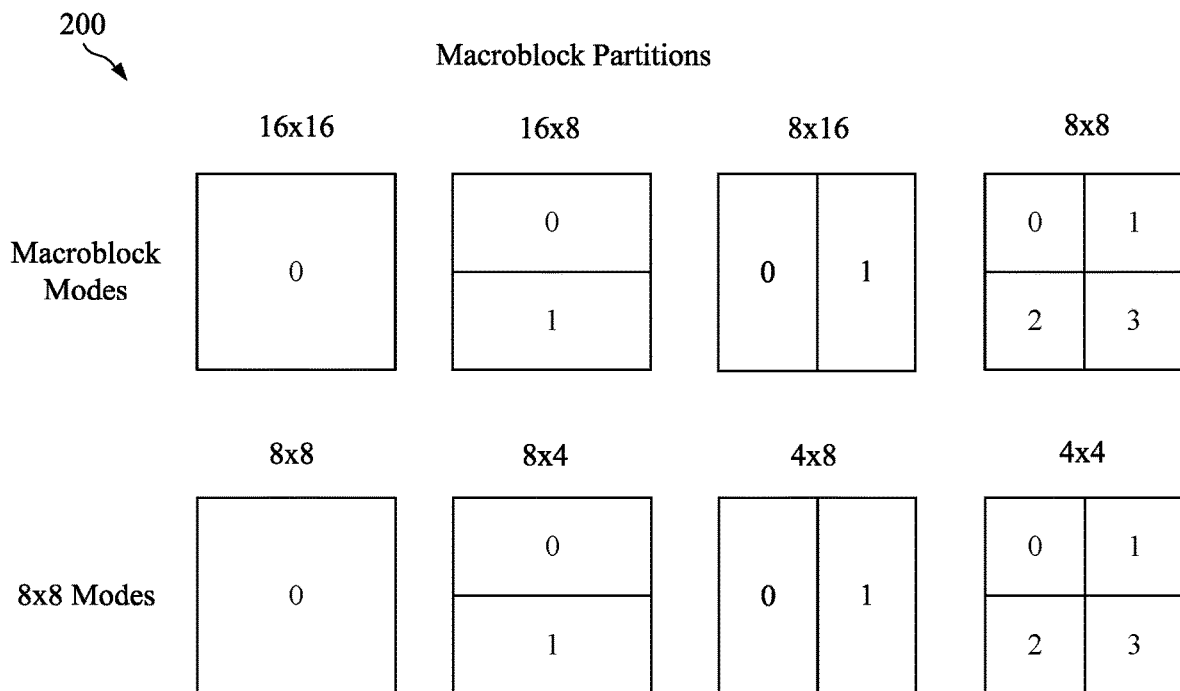
FIG. 2 is a schematic diagram of example macroblock partitions.

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A sample is a luma (light) value or chroma (color) value at a pixel.

Figure 3:
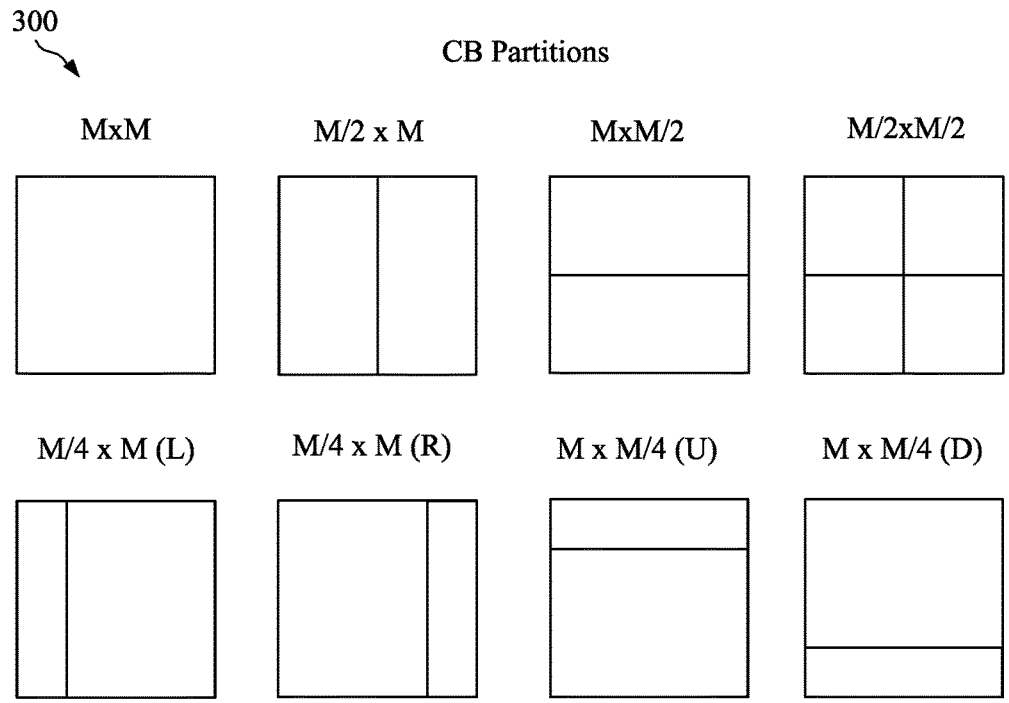
FIG. 3 is a schematic diagram of example modes for partitioning coding blocks, for example according to High Efficiency Video Coding (HEVC).

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, an M/2×M block, an M×M/2 block, an M/2×M/2 block, an M/4×M L (left) block, an M/4×M R (right) block, an M×M/4 U (up) block, and/or an M×M/4 D (down) block. It should be noted that the modes 300 for splitting CBs into PBs are subject to size constraints. Further, only M×M and M/2×M/2 are supported for intra picture predicted CBs.

Figure 4:
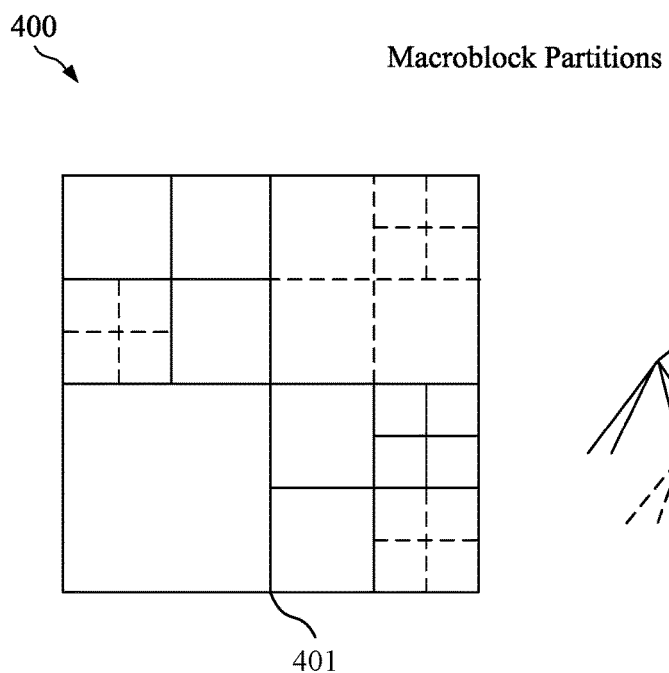
FIG. 4 is a schematic diagram of an example method for partitioning a picture for coding a residual.

FIG. 4 is a schematic diagram of an example method 400 for partitioning a picture for coding a residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts Group (VCEG) and MPEG to explore video coding technologies beyond HEVC. JVET has adopted many improvements and included such improvements into a reference software named Joint Exploration Model (JEM).

Figure 5:
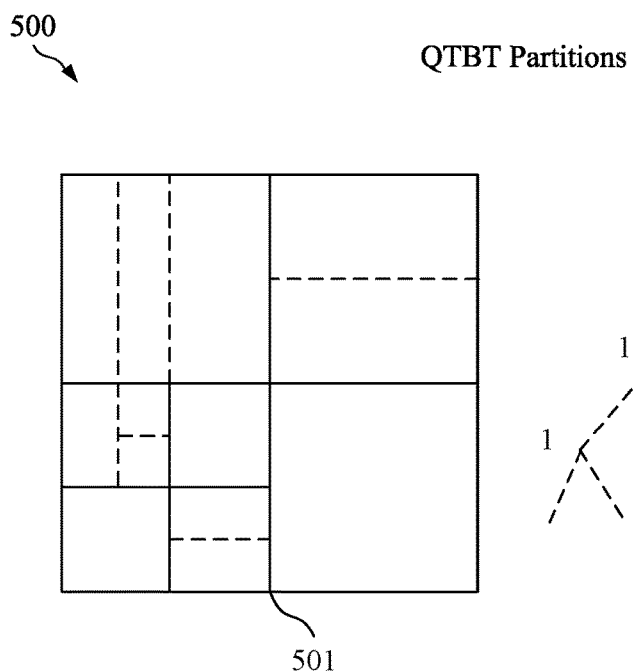
FIG. 5 is a schematic diagram of an example method for partitioning a picture, for example according to a quadtree binary tree (QTBT) structure.

FIG. 5 is a schematic diagram of an example method 500 for partitioning a picture, for example according to a quadtree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quadtree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has a width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signaled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma CTBs to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of JEM, these restrictions are removed.

Figure 6:
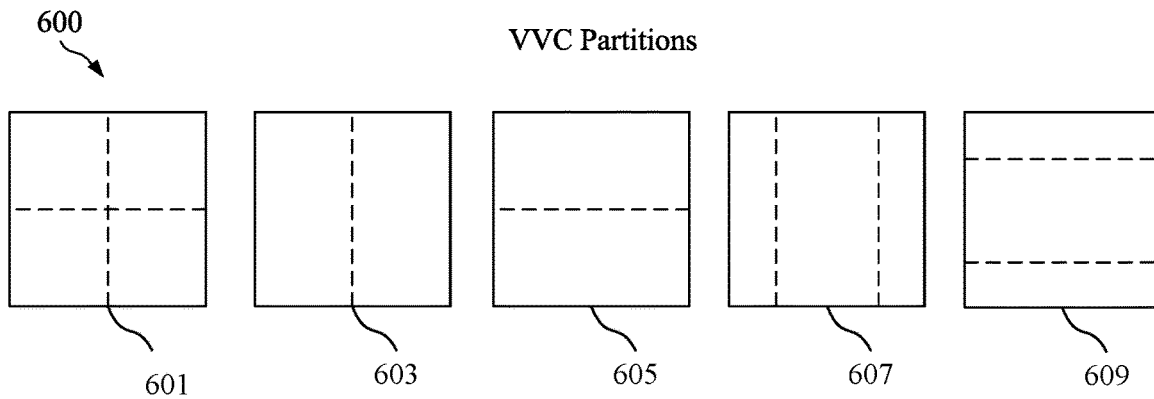
FIG. 6 is a schematic diagram of example partitioning structures used in Versatile Video Coding (VVC).

Triple-tree partitioning for VVC is now discussed. FIG. 6 is a schematic diagram 600 of example partitioning structures used in VVC. As shown, split types other than quadtree and binary tree are supported in VVC. For example, schematic diagram 600 includes a quadtree partition 601, a vertical binary tree partition 603, a horizontal binary tree partition 605, a vertical triple tree partition 607, and a horizontal triple tree partition 609. This approach introduces two triple tree (TT) partitions in addition to the quadtree and binary trees.

In an example implementation, two levels of trees are employed including a region tree (a quadtree) and a prediction tree (binary tree or triple-tree). A CTU is first partitioned by a region tree (RT). An RT leaf may be further split with prediction tree (PT). A PT leaf may also be further split with a PT until a max PT depth is reached. A PT leaf is a basic coding unit. The PT may also be called a CU for convenience. In an example implementation, a CU cannot be further split. Prediction and transform are both applied on a CU in the same way as JEM. The whole partition structure is named multiple-type-tree.

Figure 7:
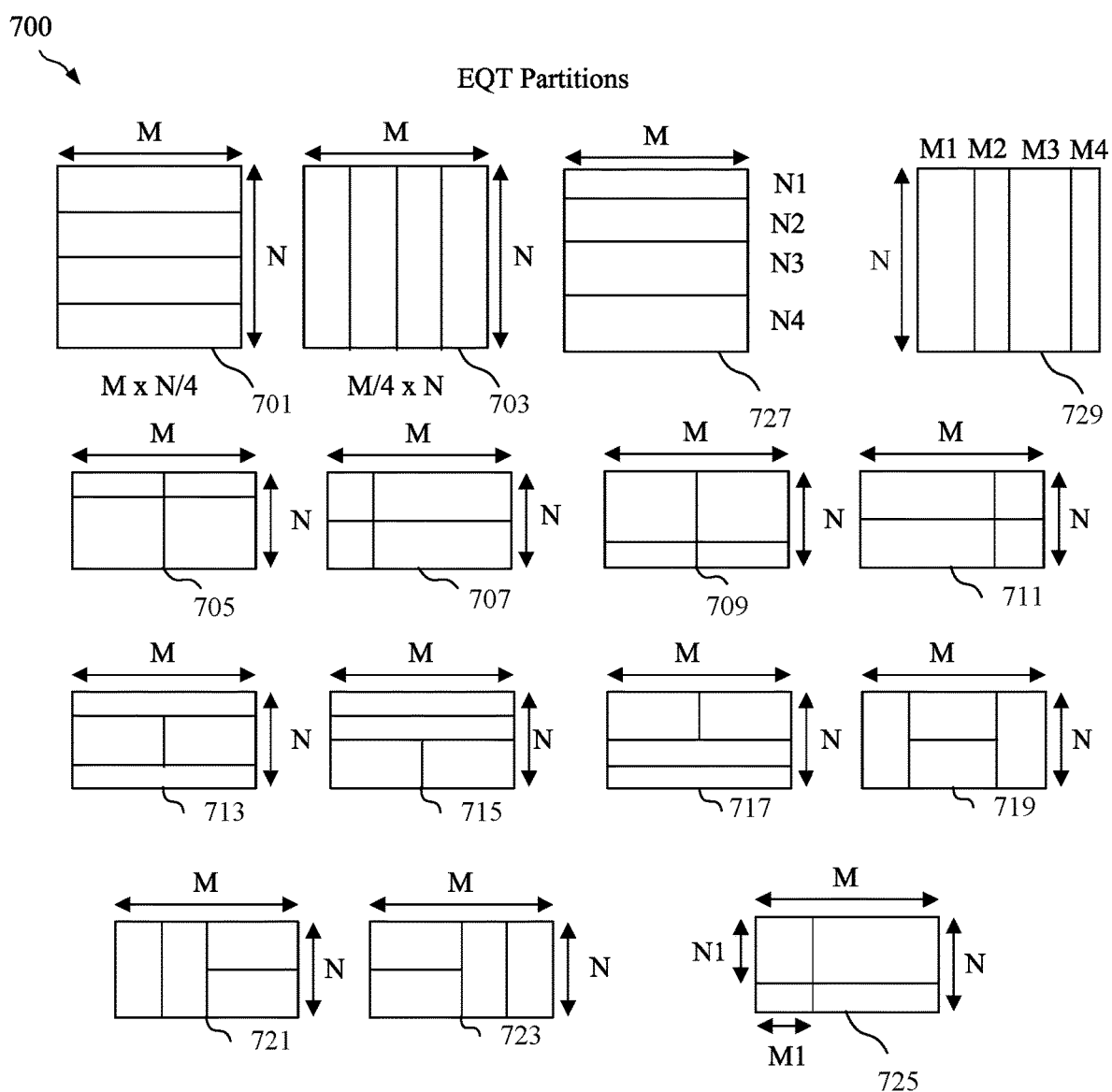
FIG. 7 is a schematic diagram of example extended quadtree (EQT) partitioning structures.

An extended quadtree is now discussed. FIG. 7 is a schematic diagram 700 of example extended quad tree (EQT) partitioning structures. An EQT partitioning structure corresponding to a block partitioning process includes an extended quadtree partitioning process for the block of video data. The extended quad partitioning structure represents partitioning the block of video data into final sub-blocks. When the extended quadtree partitioning process decides to apply an extended quadtree partition to a block, the block is always split into four sub-blocks. Decoding of the final sub-blocks is based on the video bitstream. Decoding of the block of video data is based on the final sub-blocks decoded according to the EQT structure derived.

The EQT partitioning process can be applied to a block recursively to generate EQT leaf nodes. Alternatively, when EQT is applied to a certain block, each of the sub-blocks resulting from the EQT split may further be split into BT and/or QT and/or TT and/or EQT and/or other kinds of partition trees. In one example, EQT and QT may share the same depth increment process and the same restrictions of leaf node sizes. In this case, the partitioning of one node can be implicitly terminated when the size of the node reaches a minimum allowed quadtree leaf node size or EQT depth when the node reaches a maximum allowed quadtree depth. Alternatively, EQT and QT may share different depth increment processes and/or restrictions of leaf node sizes. The partitioning of one node by EQT may be implicitly terminated when the size of the node reaches a minimum allowed EQT leaf node size or the EQT depth associated with the node reaches a maximum allowed EQT depth. In one example, the EQT depth and/or the minimum allowed EQT leaf node sizes may be signaled in a sequences parameter set (SPS), a picture parameter set (PPS), a slice header, a CTU, a region, a tile, and/or a CU.

EQT may not use a quadtree partition applied to a square block, for example where the block has a size of M×N where M and N are equal or unequal non-zero positive integer values. Instead, EQT splits one block equally into four partitions, such as an M/4×N split 703 or an M×N/4 split 701. Split 727 and split 729 show general examples of split 701 and 703, respectively. For example, split 727 is split into M×N1, M×N2, M×N3, and M×N4, where N1+N2+N3+N4=N. Further, split 729 is split into M1×N, M2×N, M3×N and M4×N where M1+M2+M3+M4=M.

In another example, the EQT can split the shape equally into four partitions where the partition size is dependent on the maximum and minimum values of M and N. In one example, one 4×32 block may be split into four 4×8 sub-blocks while a 32×4 block may be split into four 8×4 sub-blocks.

In another example, EQT splits one block equally into four partitions, such as two partitions are with size equal to (M*w0/w)×(N*h0/h) and the other two are with (M*(w−w0)/w)×(N*(h−h0)/h) as shown by split 705, split 707, split 709, and split 711. For example, w0 and w may be equal to 1 and 2, respectively, such that the width is reduced by half while the height can use other ratios instead of 2:1 to get the sub-blocks. In another example, h0 and h may be equal to 1 and 2, respectively, such that the height is reduced by half while the width can use other ratios instead of 2:1. For example, split 705 includes a sub-block width fixed to be M/2 with a height equal to N/4 or 3N/4 with a smaller selection for the top two partitions. For example, split 707 includes a sub-block height fixed to be N/2 with a width equal to M/4 or 3M/4 with a smaller selection for the left two partitions. For example, split 709 includes a sub-block width fixed to be M/2 with a height equal to N/4 or 3N/4 with a smaller selection for the bottom two partitions. For example, split 711 includes a sub-block height fixed to be N/2 with a width equal to M/4 or 3M/4 with a smaller selection for the right two partitions.

Split 713, split 715, split 717, split 719, split 721, and split 723 show other examples of quadtree partitioning. For example, split 713, split 715, and split 717 show options where the shape is split by M×N/4 and M/2×N/2. For example, split 719, split 721, and split 723 show options where the shape is split by N×M/4 and N/2×M/2.

Split 725 shows a more general case of quadtree partitioning with different shapes of partitions. In this case, split 725 is split such that M1×N1, (M−M1)×N1, M1×(N−N1) and (M−M1)×(N−N1).

Figure 8:
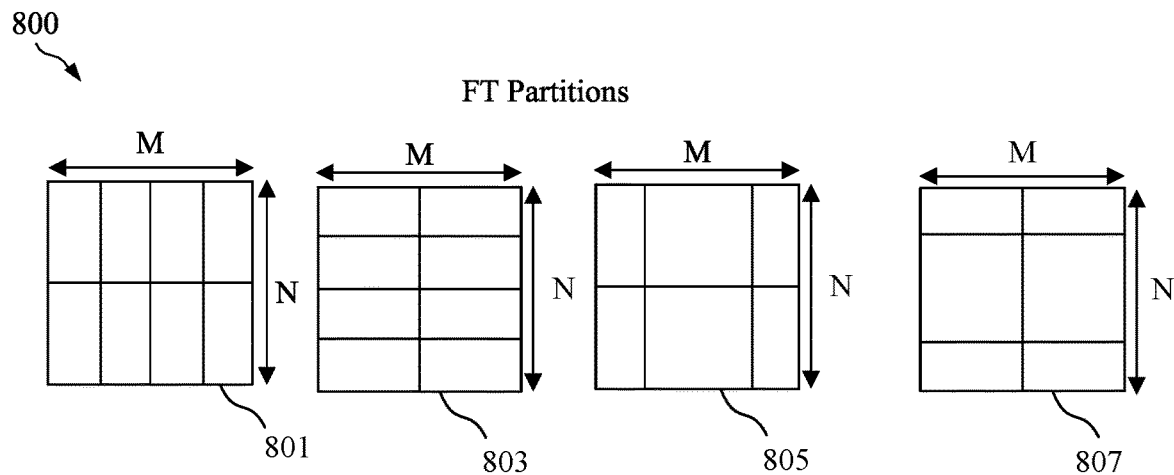
FIG. 8 is a schematic diagram of example flexible tree (FT) partitioning structures.

FIG. 8 is a schematic diagram 800 of example flexible tree (FT) partitioning structures. An FT partitioning structure corresponds to a block partitioning process including an FT partitioning process for the block of video data. The FT partitioning structure represents a partitioning for a block of video data into final sub-blocks. When the FT partitioning process decides to apply an FT partition to a block, the block is split into K sub-blocks wherein K could be larger than 4. The final sub-blocks can be coded based on the video bitstream. Further, the block of video data can be decoded based on the final sub-blocks decoded according to the FT structure derived. The FT partitioning process can be applied to a given block recursively to generate FT tree leaf nodes. The partitioning of one node is implicitly terminated when the node reaches a minimum allowed FT leaf node size or FT depth associated when the node reaches a maximum allowed FT depth. Further, when FT is applied to a certain block, multiple sub-blocks can be created. Each of the sub-blocks created by FT may further be split into BT, QT, EQT, TT, and/or other kinds of partition trees. In an example, the FT depth or the minimum allowed FT leaf node sizes or the minimum allowed partition size for FT may be signaled in an SPS, a PPS, a slice header, a CTU, a region, a tile, and/or a CU. Similar to EQT, all of the sub-blocks created by FT partitions may be the same or different sizes.

Schematic diagram 800 includes example FT partitioning structures where the number of sub-blocks, denoted as K, is set equal to six or eight. Split 801 is a partitioning structure with K=8, M/4*N/2. Split 803 is a partitioning structure with K=8, M/2*N/4. Split 805 is a partitioning structure with K=6, M/2*N/2 and M/4*N/2. Split 807 is a partitioning structure with K=6, M/2*N/2 and M/2*N/4.

Figure 9:
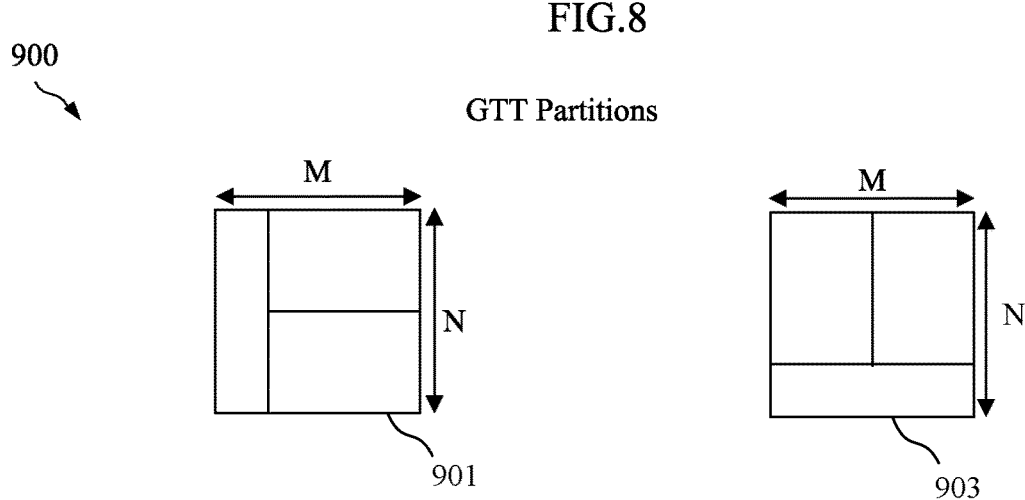
FIG. 9 is a schematic diagram of example generalized triple tree (GTT) partitioning structures.

FIG. 9 is a schematic diagram 900 of example generalized TT (GTT) partitioning structures. For the TT partitioning structure, the restriction of splitting along either horizontal or vertical may be removed. The GTT partition pattern may be defined as splitting for both horizontal and vertical. Split 901 employs a left split from a vertical TT split and a horizontal BT split of the remaining area. Split 903 employs a bottom split from a horizontal TT split and a vertical BT split of the remaining area. In some examples, the partitioning EQT, FT, and/or GTT partitioning methods may be applied under certain conditions. In other words, when the condition(s) are not satisfied, there is no need to signal the partition types. In another example, the EQT, FT, and/or GTT partitioning methods may be used to replace other partition tree types. In another example, the EQT, FT, and/or GTT partitioning methods may be only used as a replacement for other partition tree types under certain conditions. In one example, the condition may be based on the picture, slice types, block sizes, the coded modes, and/or whether a block is located at a picture, slice, and/or tile boundary. In one example, EQT may be treated in the same way as QT. In this case, when the QT partition tree type is selected, more flags/indications of the detailed quadtree partition patterns may be further signaled. In some examples, EQT may be treated as additional partition patterns. In one example, the signaling of partitioning methods of EQT, FT, and/or GTT may be conditional. For example, one or more EQP, FT, and/or GTT partitioning methods may not be used in some cases, and the bits corresponding to signal these partitioning methods are not signaled.

Figure 10:
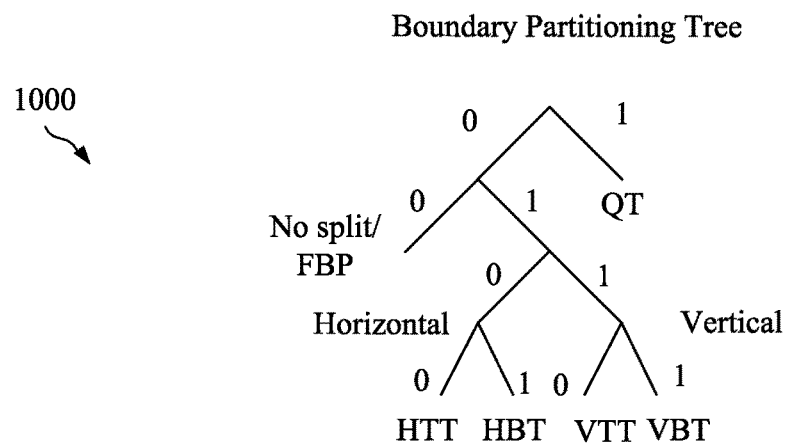
FIG. 10 is a schematic diagram of an example boundary partitioning tree.

FIG. 10 is a schematic diagram of an example boundary partitioning tree 1000, which is also known as a versatile boundary partition. The boundary partitioning tree 1000 is an example boundary handling method for VVC and/or Audio and Video Coding Standard Workgroup Part three (AVS-3.0). Since the forced quadtree boundary partition solution in VVC is not optimized, the boundary partitioning tree 1000 uses regular block partition syntax to maintain continuity with the CABAC engine as well as to match the picture boundary. The versatile boundary partition obtains the following rules (both encoder and decoder). Since the boundary partitioning tree 1000 uses exactly the same partition syntax of the normal block (non-boundary) for boundaries, the syntax is not changed. If the no split mode is parsed for the boundary CU, the forced boundary partition (FBP) is used to match the picture boundary. After the forced boundary partition is used (non-singling boundary partition), no further partition is performed. The forced boundary partition is described as follows. If the size of the normal block is larger than the maximal allowed BT size, forced QT is used to perform the FBP in the current forced partition level. Otherwise, if the bottom-right sample of current CU is located below the bottom picture boundary and not extended to the right boundary, a forced horizontal BT is used to perform the FBP in the current forced partition level. Otherwise, if the bottom-right sample of current CU is located at the right side of the right picture boundary and not below the bottom boundary, a forced vertical BT is used to perform the FBP in the current forced partition level. Otherwise, if the bottom-right sample of current CU is located at the right side of the right picture boundary and below the bottom boundary, a forced QT is used to perform the FBP in the current forced partition level.

Figure 11:
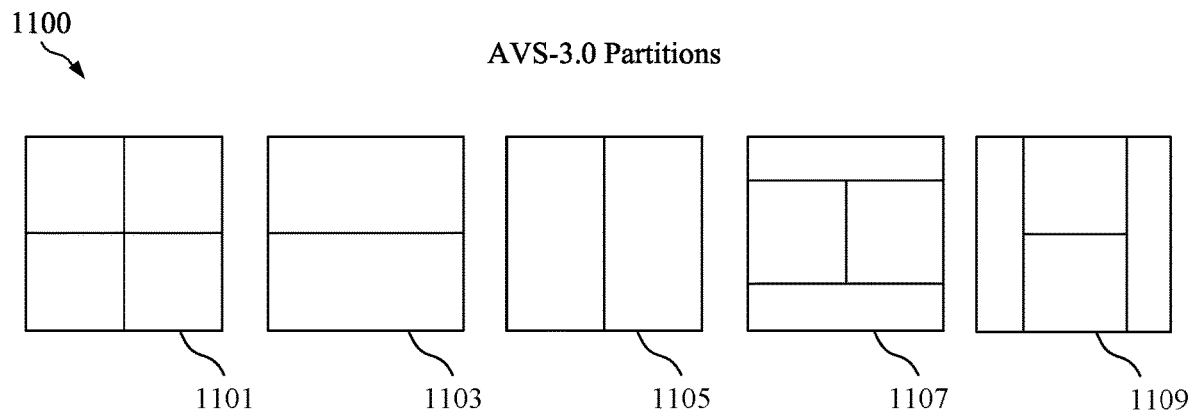
FIG. 11 is a schematic diagram of example partitioning structures used in Audio and Video Coding Standard (AVS) part three (AVS-3.0).

FIG. 11 is a schematic diagram 1100 of example partitioning structures used in Audio and Video Coding Standard (AVS) part three (AVS-3.0). Partitioning in AVS-3.0 is now discussed. The Audio and Video Coding Standard (AVS) Workgroup of China was authorized to be established by the Science and Technology Department under the former Ministry of Industry and Information Technology of People's Republic of China. With the mandate of satisfying the demands from the rapidly growing information industry, AVS is committed to producing technical standards of high quality for compression, decompression, processing, and representation of digital audio and video, and thus providing digital audio-video equipment and systems with high-efficient and economical coding/decoding technologies. AVS can be applied in wide variety of significant information sectors including high-resolution digital broadcast, high-density laser-digital storage media, wireless broad-band multimedia communication and internet broad-band stream media. AVS is one of the second generation of source coding/decoding standards and owns independent Chinese intellectual property rights. Source coding technology primarily addresses the problem of coding and compressing audio and video mass data from initial data and original sources. Hence AVS is known as digital video and audio coding technology, and is the premise of the subsequent digital transmission, storage, and broadcast. Further, AVS serves as a common standard for the digital video and audio industry.

AVS-3.0 employs a QT partitioning 1101, a vertical BT partitioning 1105, a horizontal BT partitioning 1103, a horizontal extended quad tree (EQT) partitioning 1107, and a vertical EQT partitioning 1109 to split a largest coding unit (LCU) into multiple CUs. QT partitioning, BT partitioning, and EQT partitioning can all be used for the root, internal nodes, or leaf nodes of the partitioning tree. However, QT partitioning is forbidden after any BT and/or EQT partitioning.

Figure 12:
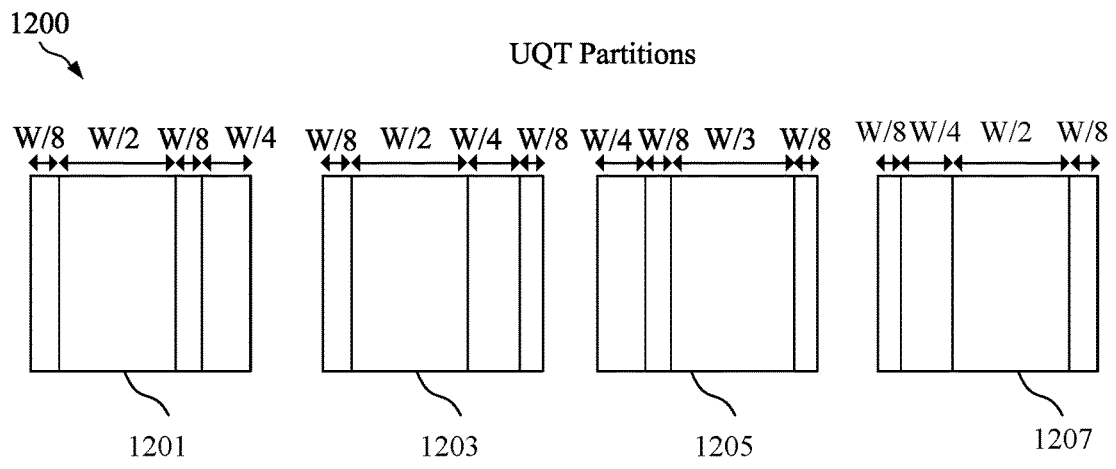
FIG. 12 is a schematic diagram of example Unsymmetrical Quadtree (UQT) partitioning structures.
Figure 12:
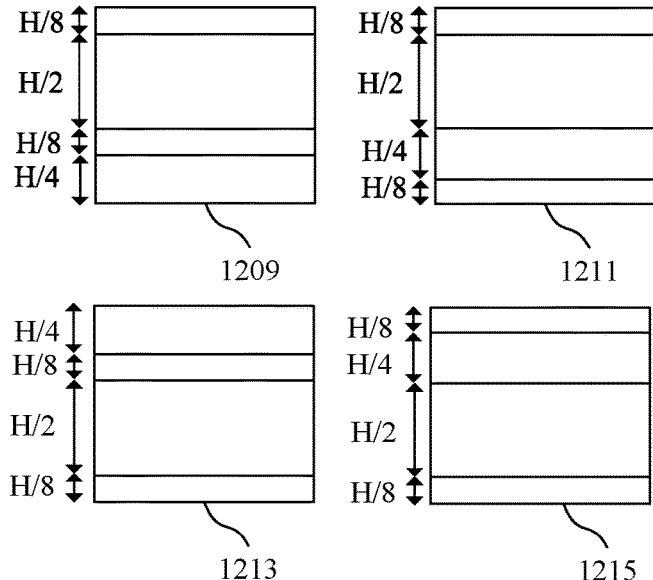

FIG. 12 is a schematic diagram 1200 of example Unsymmetrical Quadtree (UQT) partitioning structures. UQT partitioning employs a block with dimensions W×H, which is split into four partitions with dimensions W1×H1, W2×H2, W3×H3 and W4×H4, where W1, W2, W3, W4, H1, H2, H3, H4 are all integers. In one example, at least one of the partitions has a different block size compared to others. In one example, only two of the four partitions may have an equal size, and the other two are different with each other and different from the two partitions with equal size. In one example, all the parameters are in the form of power of 2. For example, W1=2N1, W2=2N2, W3=2N3, W4=2N4, H1=2M1, H2=2M2, H3=2M3, H4=2M4. In one example, UQT only splits one partition in a vertical direction, for example, H1=H2=H3=H4=H. In one example, in split 1201 W1=W/8, W2=W/2, W3=W/8, W4=W/4, H1=H2=H3=H4=H. This kind of UQT is vertical split and named as UQT1-V. In one example, in split 1203 W1=W/8, W2=W/2, W3=W/4, W4=W/8, H1=H2=H3=H4=H. This kind of UQT is vertical split and named as UQT2-V. In one example in split 1205 W1=W/4, W2=W/8, W3=W/3, W4=W/8, H1=H2=H3=H4=H. This kind of UQT is vertical split and named as UQT3-V. In one example, in split 1207 W1=W/8, W2=W/4, W3=W/2, W4=W/8, H1=H2=H3=H4=H. This kind of UQT is vertical split and named as UQT4-V.

In one example, UQT only splits one partition in a horizontal direction, for example, W1=W2=W3=W4=W. In one example, in split 1209 H1=H/8, H2=H/2, H3=H/8, H4=H/4, W1=W2=W3=W4=W. This kind of UQT is horizontal split and named as UQT1-H. In one example, in split 1211 H1=H/8, H2=H/2, H3=H/4, H4=H/8, W1=W2=W3=W4=W. This kind of UQT is horizontal split and named as UQT2-H. In one example, in split 1213 H1=H/4, H2=H/8, H3=H/2, H4=H/8, W1=W2=W3=W4=W. This kind of UQT is horizontal split and named as UQT3-H. In one example, in split 1215 H1=H/8, H2=H/4, H3=H/2, H4=H/8, W1=W2=W3=W4=W. This kind of UQT is horizontal split and named as UQT4-H.

Figure 13:
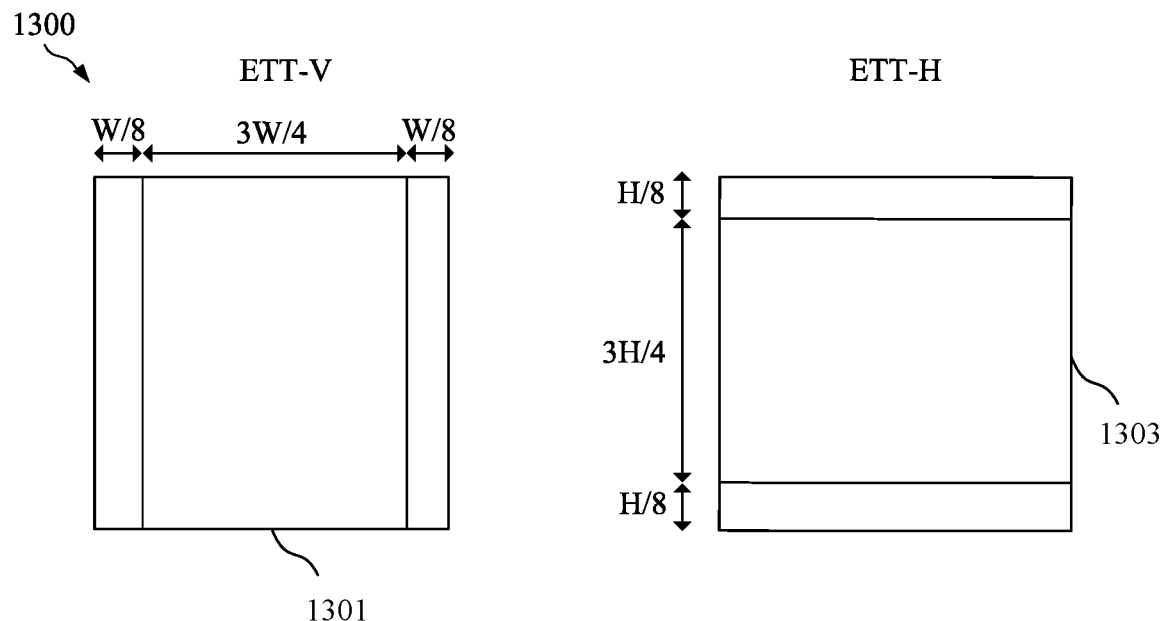
FIG. 13 is a schematic diagram of example Extended Ternary Tree (ETT) partitioning structures.

FIG. 13 is a schematic diagram 1300 of example ETT partitioning structures, including an ETT-V split 1301 and an ETT-H split 1303. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=2N2 with any positive integer N2. In another example, H2 cannot be in a form of $H2=2^{N2}$ with any positive integer N2. In one example, at least one of the parameters is in the form of power of 2. In one example, W1 is in a form of $W1=_2N1$ with a positive integer N1. In another example, H1 is in a form of $H1=_2N1$ with a positive integer N1.

In one example, ETT only splits one partition in a vertical direction, for example where W1=a1*W, W2=a2*W, and W3=a3*W, where a1+a2+a3=1, and where H1=H2=H3=H. This kind of ETT is a vertical split and may be referred to as ETT-V. In one example, ETT-V split 1301 can be used where W1=W/8, W2=3*W/4, W3=W/8, and H1=H2=H3=H. In one example, ETT only splits one partition in horizontal direction, for example where H1=a1*H, H2=a2*H, and H3=a3*H, where a1+a2+a3=1, and where W1=W2=W3=W. This kind of ETT is a horizontal split and may be referred to as ETT-H. In one example, ETT-H split 1303 can be used where H1=H/8, H2=3*H/4, H3=H/8, and W1=W2=W3=W.

Figure 14:
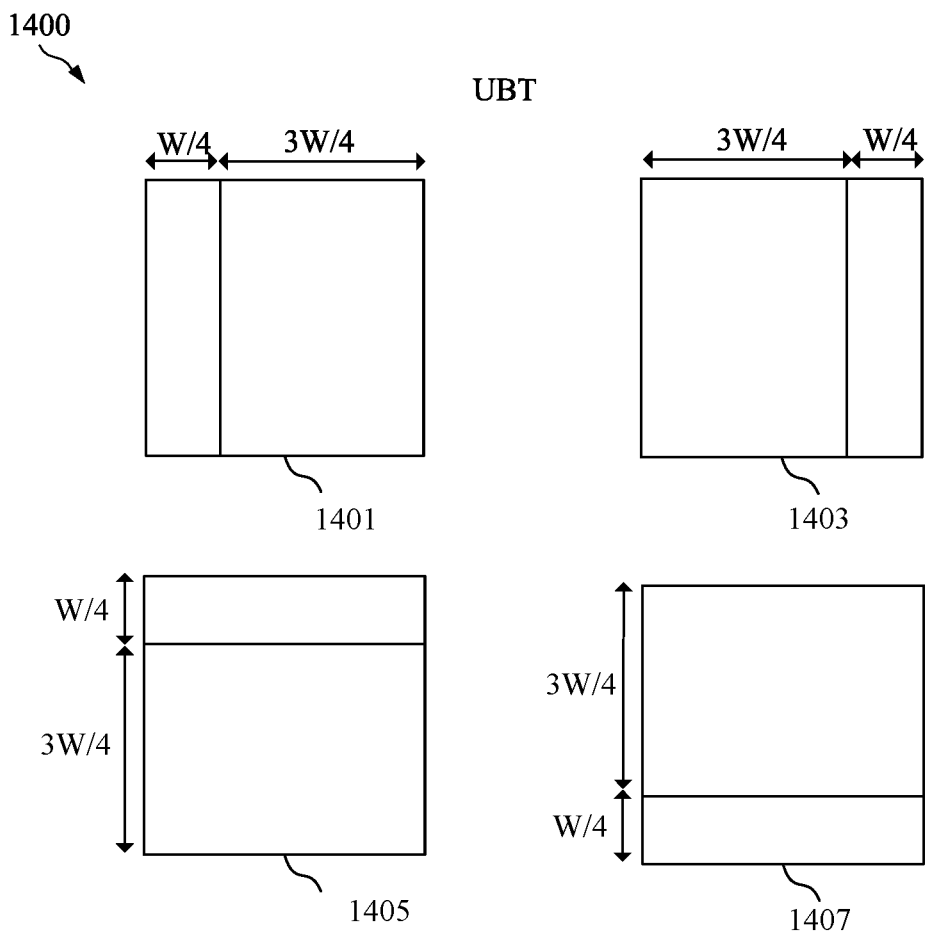
FIG. 14 is a schematic diagram of example ¼ Unsymmetrical Binary Tree (UBT) partitioning structures.

FIG. 14 is a schematic diagram 1400 of example ¼ UBT partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1−a)×W, and H1=H2=H. In such as case, the partition may be called a vertical UBT (UBT-V). In one example, a may be smaller than ½, such as ¼, ⅛, 1/16, 1/32, 1/64, etc. In such a case, the partition may be called a Type 0 UBT-V, an example of which is shown as split 1401. In one example, a may be larger than ½, such as ¾, ⅞, 15/16, 31/32, 63/64, etc. In such a case, the partition is called a Type 1 UBT-V, an example of which is shown as split 1403. In one example, H1=a×H, H2=(1−a)×H, W1=W2=W. In such a case, the partition may be called a horizontal UBT (UBT-H). In one example, a may be smaller than ½, such as ¼, ⅛, 1/16, 1/32, 1/64, etc. In such a case, the partition is called a Type 0 UBT-H, an example of which is shown as split 1405. In one example, a may be larger than ½, such as ¾, ⅞, 15/16, 31/32, 63/64, etc. In such a case, the partition may be called a Type 1 UBT-H, an example of which is shown as split 1407.

Figure 15:
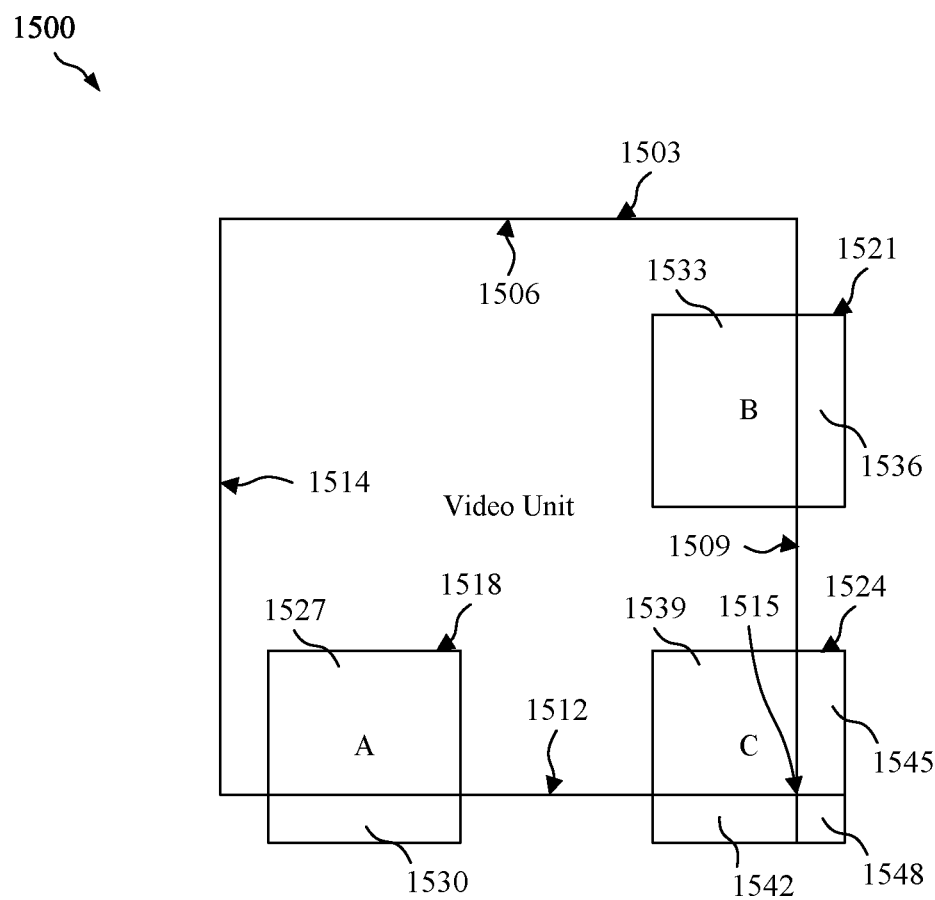
FIG. 15 is a schematic diagram of an example video unit that has been partitioned to include video blocks according to a partitioning scheme.

FIG. 15 is a schematic diagram 1500 of an example video unit 1503 that has been partitioned to include video blocks according to a partitioning scheme, resulting in multiple video blocks 1518, 1521, and 1524 of the video unit 1503. A video unit 1503 may be a video sequence, a video picture, a video subpicture, a video slice, or a virtual pipeline data unit (VPDU). A video block 1518, 1521, and 1524 may be a coding block (CB), a transform block (TB), a prediction block (PB), a CU, or a CTU. For example, a video block 1518, 1521, and 1524 may be a sub-block or a child-block of the video unit 1503.

The video unit 1503 may include boundaries 1506, 1509, 1512, 1514, and 1515. A boundary 1506, 1509, 1512, 1514, or 1515 of the video unit 1503 may be an edge or outer limit of the video unit 1503. The boundary 1506 may be a top boundary 1506, the boundary 1509 may be a right boundary 1509, the boundary 1512 may be a bottom boundary 1512, the boundary 1514 may be a left boundary 1514, and the boundary 1515 may be a corner boundary 1515. The top boundary 1506 may be a boundary at a first edge of the video unit 1503 in the X axis, while the bottom boundary 1512 may be a boundary at an edge opposite to the first edge of the video unit 1503 in the X axis. The left boundary 1514 may be a boundary at a first edge of the video unit 1503 in the Y axis, while the bottom boundary 1509 may be a boundary at an edge opposite to the first edge of the video unit 1503 in the Y axis. The video unit 1503 may include a corner boundary 1515 at the top left, top right, bottom left, and bottom right corners of the video unit 1503.

The video blocks 1518, 1521, and 1524 may be sub-blocks or child-blocks of the video unit 1503, after a partitioning scheme has been applied to partition the video unit 1503. The partitioning scheme may be UBT, ETT, UQT, EQT, or other any other partitioning scheme. In some cases, the "partitioning scheme" referred to hereinafter may exclude the QT, BT, and TT partitioning schemes. As shown in FIG. 15, one or more of the video blocks 1518, 1521, and 1524 may be at the boundary 1506, 1509, 1512, 1514, or 1515 of the video unit 1503, such that at least a portion of the one or more video blocks 1518, 1521, and 1524 extend outside one or more of the boundaries 1506, 1509, 1512, 1514, and 1515.

As shown in FIG. 15, the video blocks 1518, 1521, and 1524 positioned at the boundaries 1509, 1512, and 1515 may include at least one portion positioned within the boundary 1509, 1512, and 1515 of the video unit 1503 and at least one portion positioned outside the boundary 1509, 1512, and 1515. Block 1518 includes a portion 1527 positioned within the bottom boundary 1512 inside the video unit 1503, and a portion 1530 positioned outside the bottom boundary 1512 external to the video unit 1503. Block 1521 includes a portion 1533 positioned within the right boundary 1509 inside the video unit 1503, and a portion 1536 positioned outside the right boundary 1509 external to the video unit 1503. Lastly, block 1524 includes a portion 1539 positioned within the bottom boundary 1512 and the right boundary 1509 inside the video unit 1503, a portion 1542 positioned outside the bottom boundary 1512 external to the video unit 1503, a portion 1545 positioned outside the right boundary 1509 external to the video unit 1503, and a portion 1548 positioned outside the corner 1515 (i.e., outside both the 1509 and 1512) external to the video unit 1503. While FIG. 15 shows the all of the video blocks 1518, 1521, and 1524 positioned at the boundaries 1509, 1512, and 1515, it should be appreciated that some of the video blocks may not necessarily be positioned at the boundaries 1506, 1509, 1512, 1514, and 1515 of the video unit 1503.

As described above, there are multiple different possible partitioning schemes (e.g., QT, BT, TT, UQT, EQT, UBT, and/or ETT) by which to partition a video unit 1503 into multiple video blocks 1518, 1521, and 1524. An encoder may determine one or more partitioning schemes from the multitude of different possible partitioning schemes by which to partition a video unit 1503. In some cases, the partitioning of a video unit 1503 may result in one or more video blocks 1518, 1521, and 1524 having at least a portion that extends outside a boundary 1506, 1509, 1512, 1514, or 1515 of the video unit 1503. Therefore, an optimal partitioning scheme may be selected to avoid, as much as possible, partitioning the video unit 1503 into video blocks 1518, 1521, and 1524 that extend outside the boundary 1506, 1509, 1512, 1514, or 1515 of the video unit 1503. However, there may be too many combinations of different partitioning schemes by which to test the partitioning of the video unit 1503, before determining the optimal partitioning scheme by which to partition the video unit 1503 (or video blocks 1518, 1521, and 1524). In addition, the testing of different partitioning schemes for a video block 1518, 1521, or 1524 may require a large amount of computing resources, and the encoding of all the possible partitioning schemes into a bitstream may also require a large amount of computing and networking resources.

Disclosed herein are embodiments directed to a technical solution to the foregoing technical problem. According to various embodiments, the encoder may determine an application of a partitioning scheme to a video block 1518, 1521, or 1524 positioned at a boundary 1506, 1509, 1512, 1514, and 1515 of the video unit 1503 based on a rule, and then convert visual media data and a bitstream based on the application of the partitioning scheme to the video block 1518, 1521, or 1524. The application of the partitioning scheme to the video unit 1503 may result in a plurality of video blocks 1518, 1521, and 1524, of which one or more of the video blocks 1518, 1521, and 1524 may have at least a portion 1530, 1536, 1542, 1545, and 1548 positioned outside the boundary 1506, 1509, 1512, 1514, or 1515 of the video unit 1503. In an embodiment, the rule may indicate that the portions 1530, 1536, 1542, 1545, and 1548 of video blocks 1518, 1521, and 1524 positioned outside the boundaries 1506, 1509, 1512, 1514, and 1515 of the video unit 1503 are to be discarded. The encoder may discard the portions 1530, 1536, 1542, 1545, and 1548 of the video blocks 1518, 1521, and 1524 positioned outside the boundaries 1506, 1509, 1512, 1514, and 1515 of the video unit 1503 after applying the partitioning scheme to the video unit 1503. In an embodiment, the rule may indicate whether a partitioning scheme is allowed to be used on the video block 1518, 1521, and 1524 at the boundaries 1506, 1509, 1512, 1514, and 1515 based on a location (e.g., coordinates) of the video block 1518, 1521, and 1524 or a location (e.g., coordinates) of the top boundary 1506, right boundary 1509, bottom boundary 1512, and left boundary 1514. In an embodiment, the rule may indicate whether the partitioning scheme is allowed to be used on the video block 1518, 1521, or 1524 at the boundaries 1506, 1509, 1512, 1514, and 1515 based on at least one of dimensions of the video block 1518, 1521, or 1524, dimensions of a sub-block of the video block 1518, 1521, or 1524, a width of the video block 1518, 1521, or 1524, a height of the video block 1518, 1521, or 1524, a depth of the video block 1518, 1521, or 1524, and/or various other factors. In an embodiment, the rule may indicate that the partitioning scheme is disallowed to be used to partition the video block 1518, 1521, or 1524 when the video block 1518, 1521, or 1524 is positioned at the boundary 1506, 1509, 1512, 1514, or 1515 of the video unit 1503.

As used herein, the term "video block" may be CTU, CU, PU, TU, CB, TB, PB, or a region containing multiple samples/pixels. The term "video block" may also be referred to herein as simply a "block." The term "partitioning scheme" may also refer to a "partitioning type," "split type," or "split method" of the current block, and different examples of various partitioning schemes are described herein with reference to FIGS. 2-14. The partitioning schemes QT, BT, TT, UQT, EQT, UBT, and ETT may also be referred to herein as "QT split", "BT split", "TT split", "UQT split", "EQT split" "UBT split" and "ETT split", respectively. One split or partition could be used to indicate the splitting pattern, like QT/BT/TT/EQT/UQT/UBT/ETT, or one split or partition may be used to indicate a specific splitting method of a splitting pattern, e.g., horizontal UQT or ¼ UBT. As used herein, a block is a "dyadic block" if both a width and a height of the block is a dyadic number, which is in a form of a $2^N$, with N being a positive integer. In contrast, a block is a "non-dyadic block" if at least one of the width and the height is a non-dyadic number, which cannot be represented in a form of a $2^N$, with N being a positive integer. In one embodiment, the term "partitioning scheme" may include UBT, ETT, UQT, EQT, or other partitioning schemes, but may exclude QT, BT, and TT partitioning schemes. As used herein, the partitioning block "split[ting] a block at a boundary of a video unit" may refer to that at least one boundary may cross the block (i.e., a first part of the block is inside the video unit and a second part of the block is outside the video unit, and the block is to be split by the partitioning scheme). For example, the term "at a boundary" of the video unit may refer to the block having at least a portion outside the boundary of the video unit, or may refer to an edge or boundary of the block abutting the boundary of the video unit.

Example 1

In an embodiment, one or more partitioning schemes may be used for blocks at a boundary of a video unit, which for example may be a picture, a sub-picture, a slice, a tile, or a brick. In one example, if a partitioning scheme is used at a boundary of a video unit, at least one part split from the video unit outside the video unit due to the partitioning is discarded. In the example shown in FIG. 15, the portions 1530, 1536, 1542, 1545, and 1548 of video blocks 1518, 1521, and 1524 positioned outside the boundaries 1506, 1509, 1512, 1514, and 1515 of the video unit 1503 may discarded since the portions 1530, 1536, 1542, 1545, and 1548 are outside the boundary of the picture or video block 1503.

In an embodiment, a rule indicating whether a partitioning scheme is allowed to be used for a block at a boundary may depend on the location of the block and/or the boundary. For example, a vertical partitioning scheme (e.g., UBT-V, or UQT-V or ETT-V) is excluded when the block is at a bottom boundary (e.g., block 1518 in FIG. 15). For example, a horizontal partitioning scheme (e.g., UBT-H, or UQT-H or ETT-H) is excluded when the block is at a right boundary (e.g., block 1521 in FIG. 15). For example, a vertical partitioning scheme (e.g., UBT-V, or UQT-V or ETT-V) is excluded when the block is at a corner boundary (e.g., block 1524 in FIG. 15). For example, a horizontal partitioning scheme (e.g., UBT-H, or UQT-H or ETT-H) is excluded when the block is at a corner boundary (e.g., block 1524 in FIG. 15). For example, a horizontal and vertical partitioning scheme (e.g., UBT-V, or UQT-V or ETT-V, UBT-H, or UQT-H or ETT-H) are both excluded when the block is at a corner boundary.

In an embodiment, a rule indicating whether a partitioning scheme is allowed to be used for a first block at a boundary may depend on the dimensions of the first block and/or dimensions of a second block which is split or partitioned from the first block. In one example, when the partitioning scheme splits the first block into K child-blocks and no child block is at the boundary, then the partitioning scheme may be allowed to be used to partition the block. In another example, when the partitioning scheme splits the first block into L+P=K child-blocks, in which L child-blocks are all inside the video unit and P child-blocks are all fully outside the video unit, then the partitioning scheme may be allowed to be used. In another example, when the boundary is a bottom and/or corner boundary, and when a horizontal partitioning scheme splits the first block into L+P=K child-blocks, in which the sum of heights of the L child-blocks is equal to PH-By, and in which PH is the height of the video unit and By is the y-coordinate of the first block, then the horizontal partitioning scheme may be allowed to be used. In another example, when the boundary is a right and/or corner boundary, and when a vertical partitioning scheme splits the first block into L+P=K child-blocks, in which the sum of width of the L child-blocks is equal to PW-Bx, and in which wherein PW is the width of the video unit and Bx is the x-coordinate of the first block, then the vertical partitioning scheme may be allowed to be used. In another example, when the first block is at a corner (such as block 1524 in FIG. 15), and when a horizontal partitioning scheme splits the first block into L+P=K child-blocks, in which the sum of heights of the L child-blocks is equal to PH-By, and in which PH is the height of the video unit and By is the y-coordinate of the first block, then the horizontal partitioning scheme may be allowed to be used. In one example, when the boundary is at a corner (such as block 1524 in FIG. 15), and when a vertical partitioning scheme splits the first block into L+P=K child-blocks, in which the sum of width of the L child-blocks is equal to PW-Bx, and in which PW is the width of the video unit and Bx is the x-coordinate of the first block, then the vertical partitioning scheme may be allowed to be used. For example, the partitioning scheme may be UBT and L=P=1. In an embodiment, the partitioning scheme may always be disallowed for blocks at a bottom and/or right and/or corner boundaries.

Example 2

In an embodiment, a block which is split from a parent block at a boundary by a partitioning scheme may be disallowed to be further split into any child blocks. In an embodiment, the indication of partitioning schemes or split methods may not be signaled for the block anymore. In an embodiment, the block is treated as a leaf node.

Example 3

In an embodiment, a rule indicating whether to and/or how to apply a partitioning scheme for a block at a boundary may depend on a width/height/depth of the current block.

For example, a partitioning scheme may not be allowed when the width/height of the current block satisfies one or more conditions. Suppose the width and height of the current block are W and H, and the thresholds T1, T2 and T are integers. For example, a partitioning scheme may not be allowed when W>=T1 and H>=T2, a partitioning scheme may not be allowed when W>=T1 or H>=T2, a partitioning scheme may not be allowed when WC=T1 and H<=T2, a partitioning scheme may not be allowed when WC=T1 or H<=T2, a partitioning scheme may not be allowed when W×H<=T, a partitioning scheme may not be allowed when W×H>=T, a horizontal partitioning scheme may not be allowed when H<=T (e.g., T=16), a horizontal partitioning scheme may not be allowed when H>=T (e.g., T=128), a vertical partitioning scheme may not be allowed when W<=T (e.g., T=16), and/or a vertical partitioning scheme may not be allowed when W>=T (e.g., T=128). In an embodiment, T1, T2 and T may be signaled from the encoder to the decoder in the bitstream in at least one of the video parameter set (VPS), sequences parameter set (SPS), picture parameter set (PPS), picture header, slice header, tile group header, or tile header of the bitstream. In an embodiment, T1, T2 and T may depend on color components. For example, T1, T2 and T may be different for luma and chroma components. T1, T2 and T may depend on slice types. For example, T1, T2 and T may be different for an intra-coded slice (I-slice), a predicted slice (P-slice), or a bidirectional predicted slice (B-slice). In an embodiment, T1, T2 and T may depend on whether a luma coding tree and a chroma coding tree are separated. For example, T1, T2 and T may be different for luma and chroma components when the luma coding tree and the chroma coding tree are separated. In an embodiment, when the transform is not supported for at least one child block due to a partitioning scheme, the partitioning scheme may not be allowed. In an embodiment, when the depth of one block exceeds the allowed depth for a partitioning scheme, the partitioning scheme may not be allowed. In an embodiment, when any of a child block size exceeds the allowed block size due to a partitioning scheme, the partitioning scheme may not be allowed.

In an embodiment, a partitioning scheme may be allowed when the width/height of the current block satisfies some conditions. Suppose the width and height of the current block are W and H, and thresholds T1, T2 and T are integers. For example, a partitioning scheme may be allowed when W>=T1 and H>=T2, a partitioning scheme may be allowed when W>=T1 or H>=T2, a partitioning scheme may be allowed when WC=T1 and H<=T2, a partitioning scheme may be allowed when WC=T1 or H<=T2, a partitioning scheme may be allowed when W×H>=T, a partitioning scheme may be allowed when W×H>=T, a horizontal partitioning scheme may be allowed when H<=T (e.g., T=64), a horizontal partitioning scheme may be allowed when H>=T (e.g., T=32), a vertical partitioning scheme may be allowed when W<=T (e.g., T=64), and a vertical partitioning scheme may be allowed when W>=T (e.g., T=32). In an embodiment, T1, T2 and T may be signaled from the encoder to the decoder in the bitstream in at least one of the VPS, SPS, PPS, picture header, slice header, tile group header, or tile header of the bitstream. In an embodiment, T1, T2 and T may depend on color components. For example, T1, T2 and T may be different for luma and chroma components. In an embodiment, T1, T2 and T may depend on whether a luma coding tree and a chroma coding tree are separated. For example, T1, T2 and T may be different for luma and chroma components when the luma coding tree and the chroma coding tree are separated. In one example, T1, T2 and T may depend on picture or slice types. For example, a horizontal partitioning scheme is allowed when TP1<=H<=TP2 and/or a vertical partitioning scheme is allowed when TP1<=W<=TP2 on a P-slice/P-picture or a B-slice/B-picture, and a horizontal partitioning scheme is allowed when TI1<=H<=TI2 and/or a vertical partitioning scheme is allowed when TI1<=W<=TI2 on an I-slice/I-picture. In one example, TP1 is larger than TI1. For example, TI1=32, TP1=64, and TI2=TP2=64. In another example, TP2 is smaller than T12. For example, TI2=64, TP2=32, and TI1=TP1=32.

In an embodiment, a partitioning scheme may not be allowed when the depth of the current block satisfies one or more conditions. The depth of the current block may refer to QT depth, BT depth, TT depth, partitioning scheme (XT) depth, or (Multi-Type Tree) MTT depth. For example, a partitioning scheme may not be allowed when the split depth<=T, a partitioning scheme may not be allowed when the split depth>=T, a partitioning scheme is not allowed when the QT split depth<=T, a partitioning scheme may not be allowed when the QT split depth>=T, a partitioning scheme may not be allowed when the BT split depth>=T, a partitioning scheme may not be allowed when the BT split depth<=T, a partitioning scheme may not be allowed when the TT split depth>=T, a partitioning scheme may not be allowed when the TT split depth>=T, a partitioning scheme may not be allowed when the partitioning scheme split depth<=T, a partitioning scheme may not be allowed when the partitioning scheme split depth>=T, a partitioning scheme may not be allowed when the MTT split depth<=T, and a partitioning scheme may not be allowed when the MTT split depth>=T. In an embodiment, T1, T2 and T may be signaled from the encoder to the decoder in the bitstream in at least one of the VPS, SPS, PPS, picture header, slice header, tile group header, or tile header of the bitstream. In an embodiment, T1, T2 and T may depend on color components. For example, T1, T2 and T may be different for luma and chroma components. In an embodiment, T1, T2 and T may depend on slice types. For example, T1, T2 and T may be different for an I-slice, a P-slice, or a B-slice. T1, T2 and T may depend on whether a luma coding tree and a chroma coding tree are separated. For example, T1, T2 and T may be different for luma and chroma components when the luma coding tree and the chroma coding tree are separated.

In an embodiment, a partitioning scheme may be allowed when the depth of the current block satisfies one or more conditions. The depth of the current block may refer to QT depth, BT depth, TT depth, partitioning scheme depth or MTT depth. For example, a partitioning scheme may be allowed when the split depth<=T, a partitioning scheme may be allowed when the split depth>=T, a partitioning scheme may be allowed when the QT split depth<=T, a partitioning scheme may be allowed when the QT split depth>=T, a partitioning scheme may be allowed when the BT split depth>=T, a partitioning scheme may be allowed when the BT split depth<=T, a partitioning scheme may be allowed when the TT split depth>=T, a partitioning scheme may be allowed when the TT split depth>=T, a partitioning scheme may be allowed when the partitioning scheme split depth<=T, a partitioning scheme may be allowed when the partitioning scheme split depth>=T, a partitioning scheme may be allowed when the MTT split depth<=T, and a partitioning scheme may be allowed when the MTT split depth>=T. In an embodiment, T1, T2 and T may be signaled from the encoder to the decoder in the bitstream in at least one of the VPS, SPS, PPS, picture header, slice header, tile group header, or tile header of the bitstream. In an embodiment, T1, T2 and T may depend on color components. For example, T1, T2 and T may be different for luma and chroma components. In an embodiment, T1, T2 and T may depend on slice types. For example, T1, T2 and T may be different for an I-slice, a P-slice, or a B-slice. In an embodiment, T1, T2 and T may depend on whether a luma coding tree and a chroma coding tree are separated. For example, T1, T2 and T may be different for luma and chroma components when the luma coding tree and the chroma coding tree are separated.

Example 4

In an embodiment, a rule indicating whether to and/or how to apply a partitioning scheme for a block at a boundary may depend on coding information at different levels, such as sequence level, temporal layer level, picture level, slice level, block level, etc. In an embodiment, a rule indicating whether to and/or how to apply a partitioning scheme for a block at a boundary may depend on color format (such as 4:4:4 or 4:2:0) and/or color components of the video unit or video block. In an embodiment, a rule indicating whether to and/or how to apply a partitioning scheme for a block at a boundary may depend on whether luma and chroma coding trees are separated for the video unit or video block. For example, a partitioning scheme may only be applied on a luma component when luma and chroma coding trees are separated.

In an embodiment, a rule indicating whether to and/or how to apply a partitioning scheme for a block at a boundary may be signaled from encoder to decoder. In an embodiment, an indication of the partitioning scheme and/or the rule may be signaled in the VPS, SPS, PPS, picture header, slice header, tile group header, or tile header of the bitstream to indicate whether a partitioning scheme is allowed to be used on a video unit or video unit. In an embodiment, a VPS, SPS, PPS, picture header, slice header, tile group header, or tile header of the bitstream may indicate which kinds or types of partitioning schemes are allowed to be used on a video unit or video unit. In an embodiment, whether to and/or how to apply a partitioning scheme for a block at a boundary may depend on the temporal layer of the slice or picture. In an embodiment, whether to and/or how to apply a partitioning scheme for a block at a boundary may depend on the picture or slice type, such as I-slice or P/B-slice. In an embodiment, whether to and/or how to apply a partitioning scheme for a block at a boundary may depend on color component/color format. For example, a partitioning scheme may be allowed for a block at a boundary of a luma component, but not allowed for a block at a boundary of a chroma component.

Example 5

In an embodiment, partitioning information (or splitting information), for a block at a boundary, including the partition scheme and the rules defined herein may be included in the bitstream, and for example, added to the bitstream by the encoder in one or more syntax elements. For example, the syntax elements may be included in the VPS, SPS, PPS, picture header, slice header, tile group header, or tile header of the bitstream. In an embodiment, the signalling of the partitioning information, for a block at a boundary, in the bitstream may depend on whether a partitioning scheme is allowed to be used for the block. For example, a syntax element indicating whether a partitioning scheme is used may not be signaled when the partitioning scheme is not allowed for the block. For example, a syntax element indicating whether a horizontal partitioning scheme is used may not be signaled when the horizontal partitioning scheme is not allowed for the block. For example, a syntax element indicating whether a vertical partitioning scheme is used may not be signaled when the vertical partitioning scheme is not allowed for the block. For example, no partitioning information may be signaled for the block when all splitting methods are disallowed for the block except a partitioning method. In this case, the decoder may infer the partitioning scheme for the block. For example, the bitstream may exclude partitioning information regarding any partitioning scheme when only one partitioning scheme is allowed to be used on the video block. The decoder may infer the one partitioning scheme accordingly.

Example 6

The binarization of syntax elements (i.e., the encoding of the bitstream into binary format), which are related to the partitioning information and/or context selection for the syntax elements may be dependent on whether one or multiple partitioning schemes are allowed to be used for the block. The binarization of the syntax elements and/or context selection for the syntax elements for blocks at a boundary may depend on whether one or multiple partitioning schemes are allowed to be used for the blocks. The binarization of the syntax elements and/or context selection for those syntax elements for blocks not at a boundary may depend on whether one or multiple partitioning schemes are allowed to be used for the blocks.

Figure 16:
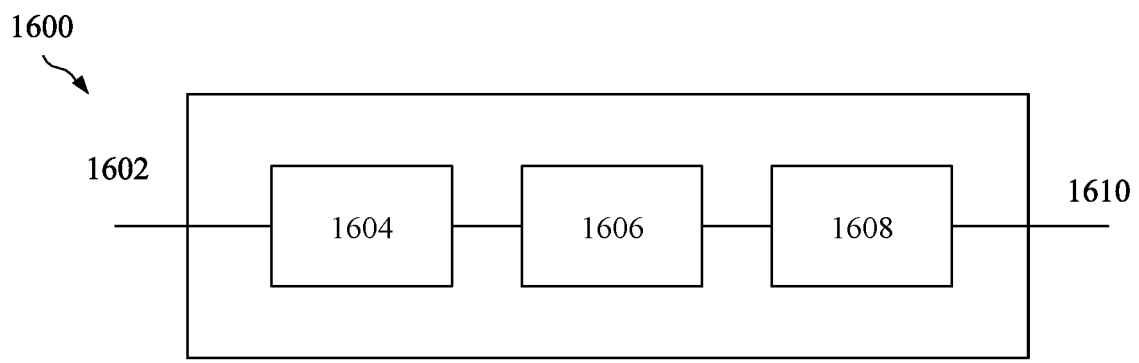
FIG. 16 is a block diagram showing an example video processing system.

FIG. 16 is a block diagram showing an example video processing system 1600 in which various techniques disclosed herein may be implemented. Various implementations may include some or all of the components of the system 1600. The system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wireless Fidelity (Wi-Fi) or cellular interfaces.

The system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by a component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 17:
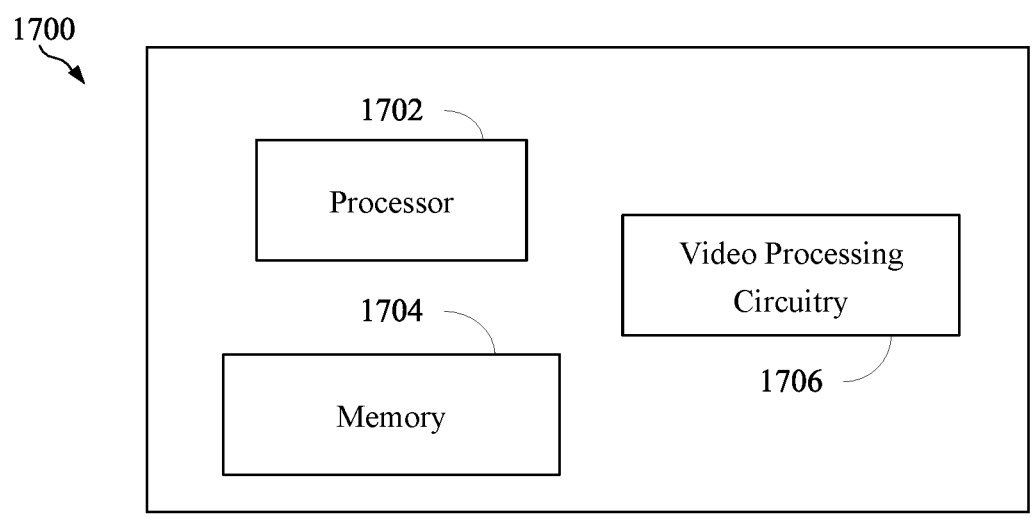
FIG. 17 is a block diagram of an example video processing apparatus.

FIG. 17 is a block diagram of an example video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing circuitry 1706. The processor(s) 1702 may be configured to implement one or more methods described in the present document. The memory (memories) 1704 may be used for storing data and code used for implementing the methods and techniques described herein. The video processing circuitry 1706 may be used to implement, in hardware circuitry, some techniques described in the present document. In some embodiments, the video processing circuitry 1706 may be at least partly included in the processor 1702, e.g., a graphics co-processor.

Figure 18:
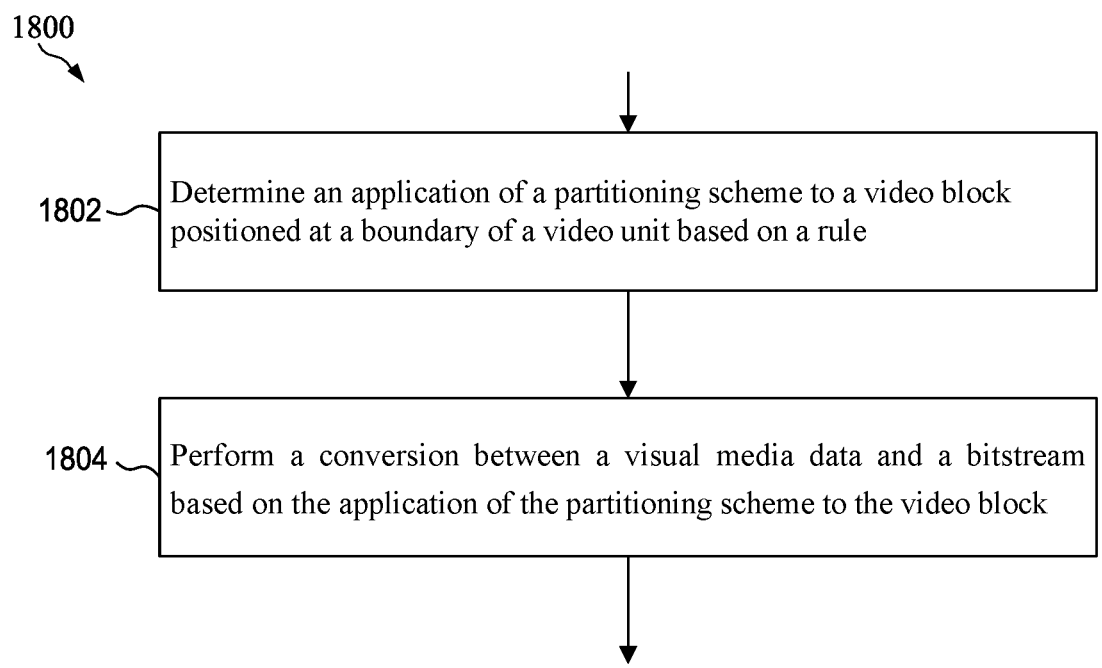
FIG. 18 is a flowchart for an example method of video processing.

FIG. 18 is a flowchart for an example method 1800 of video processing. The method 1800 includes a determination of an application of a partitioning scheme to a video block positioned at a boundary of a video unit based on a rule at step 1802. At step 1804, a conversion is performed between a visual media data and a bitstream based on the application of the partitioning scheme to the video block. For example, step 1802 may include applying the rules or constraints described herein to determine the application of the partitioning scheme to a video block. Step 1804 can then include performing video encoding at an encoder or video decoding at decoder, for example by employing the results determined by the equations and/or algorithms.

In an embodiment, a video processing method comprises determining an application of a partitioning scheme to a video block positioned at a boundary of a video unit based on a rule, and performing a conversion between a visual media data and a bitstream based on the application of the partitioning scheme to the video block. In an embodiment, when the application of the partitioning scheme to the video unit results in at least a portion of the video block being positioned outside the boundary of the video unit, wherein the rule indicates that the portion of the video block positioned outside the boundary of the video unit is to be discarded, and wherein the method further comprises discarding the portion of the video block positioned outside the boundary of the video unit after applying the partitioning scheme to the video unit. In an embodiment, the rule indicates whether the partitioning scheme is allowed to be used on the video block at the boundary based on at least one of a location of the video block or a location of the boundary. In an embodiment, the rule indicates whether the partitioning scheme is allowed to be used on the video block at the boundary based on at least one of dimensions of the video block or dimensions of a sub-block of the video block, and wherein the sub-block of the video block is partitioned from the video block. In an embodiment, the rule indicates that the partitioning scheme is allowed to be used to partition the video block when the application of the partitioning scheme to the video block results in a plurality of sub-blocks, wherein a first subset of the plurality of sub-blocks are outside the boundary of the video unit, the rule indicates that the horizontal partitioning scheme is allowed to be used to partition the video block when the boundary is at least one of a bottom boundary or corner boundary of the video unit and when the application of a horizontal partitioning scheme to the video block results in the plurality of sub-blocks, wherein a sum of heights of a second subset of the plurality of sub-blocks within the boundary of the video unit is equal to a difference between a height of the video unit and a y-coordinate of the video block, the rule indicates that the vertical partitioning scheme is allowed to be used to partition the video block when the boundary is at least one of a right boundary or the corner boundary of the video unit and when the application of a vertical partitioning scheme to the video block results in the plurality of sub-blocks, wherein a sum of widths of the second subset of the plurality of sub-blocks within the boundary of the video unit is equal to a difference between a width of the video unit and an x-coordinate of the video block, the rule indicates that the horizontal partitioning scheme is allowed to be used to partition the video block when the video block is at the corner boundary of the video unit and when the application of the horizontal partitioning scheme to the video block results in the plurality of sub-blocks, wherein the sum of heights of the second subset of the plurality of sub-blocks within the boundary of the video unit is equal to the difference between the height of the video unit and the y-coordinate of the video block, and the rule indicates that the vertical partitioning scheme is allowed to be used to partition the video block when the video block is at the corner boundary of the video unit and when the application of the vertical partitioning scheme to the video block results in the plurality of sub-blocks, wherein the sum of widths of the second subset of the plurality of sub-blocks within the boundary of the video unit is equal to the difference between a width of the video unit and the x-coordinate of the video block. In an embodiment, the rule indicates that the partitioning scheme is disallowed to be used to partition the video block when the video block is positioned at the boundary of the video unit, and wherein the bitstream excludes an indication of the partitioning scheme when the partitioning scheme is disallowed to be used to partition the video block. In an embodiment, the rule indicates whether the partitioning scheme is allowed to be used on the video block at the boundary based on at least one of a width of the video block, a height of the video block, or a depth of the video block. In an embodiment, the rule indicates whether the partitioning scheme is allowed to be used on the video block at the boundary based on a comparison between a threshold and at least one of a width of the video block, a height of the video block, or a depth of the video block. The threshold may be based on at least one of a color component of the video block, a slice type of the video block, a picture type of the video block, a luma coding tree of the video block, or a chroma coding tree of the video block. The bitstream may comprise an indication of the threshold. In an embodiment, the rule is based on coding information of the video block. In an embodiment, the coding information comprises at least one of a color format of the video block or a color component of the video block, and wherein the rule is further based on whether a luma coding tree and a chroma coding tree of the video block are separated. In an embodiment, the bitstream comprises an indication of whether the partitioning scheme is allowed to be used on the video block. In an embodiment, the bitstream comprises an indication of the partitioning scheme allowed to be used on the video block. In an embodiment, the rule indicates whether the partitioning scheme is allowed to be used on the video block at the boundary based on at least one of a picture type of the video block, a slice type of the video block, an intra-coded slice (I-slice) of the video block, a predicted slice (P-slice) of the video block, a bidirectional predicted slice (B-slice) of the video block, a temporal layer of the of the video block, a color component of the video block, or a color format of the video block. In an embodiment, the bitstream excludes a syntax element indicating whether the partitioning scheme is allowed to be used on the video block when the partitioning scheme is disallowed from being used to partition the video block. In an embodiment, the bitstream excludes information regarding any partitioning scheme when only one partitioning scheme is allowed to be used on the video block. In an embodiment, a binarization of syntax elements related to partitioning schemes is based on whether one or a plurality of partitioning schemes are allowed to be used to partition the video block.

Figure 20:
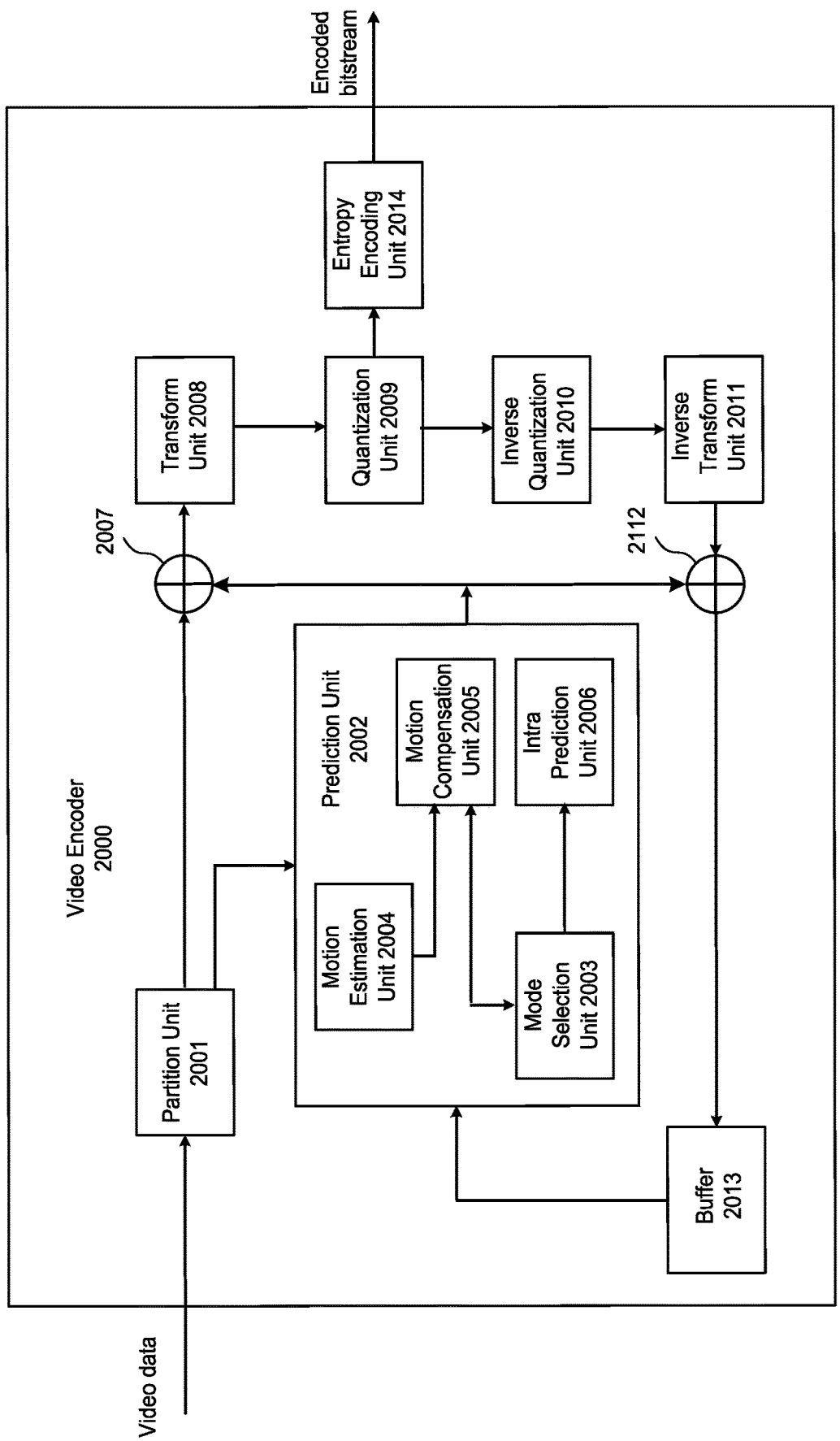
FIG. 20 is a block diagram illustrating an example of a video encoder.
Figure 21:
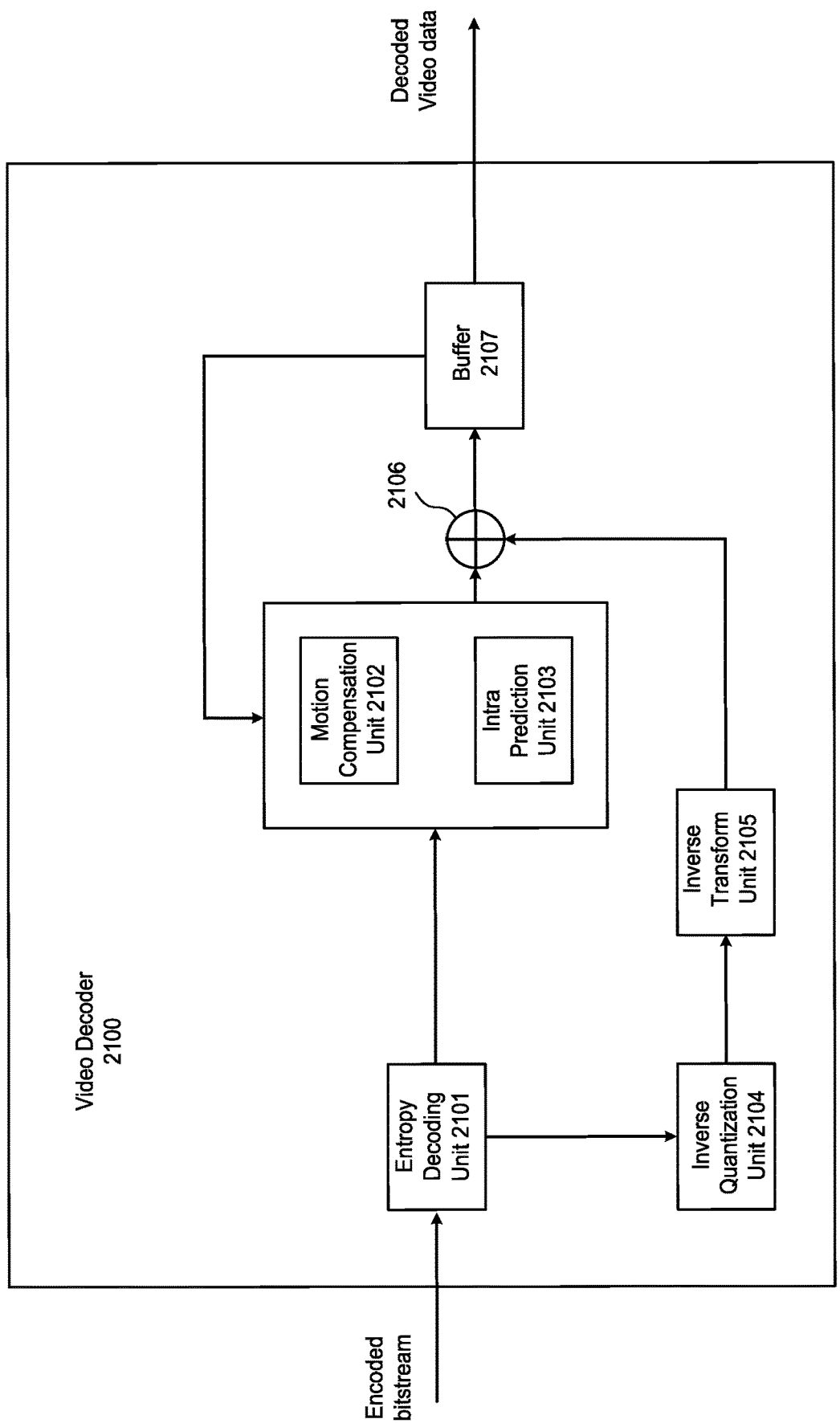
FIG. 21 is a block diagram illustrating an example of a video decoder.
Figure 22:
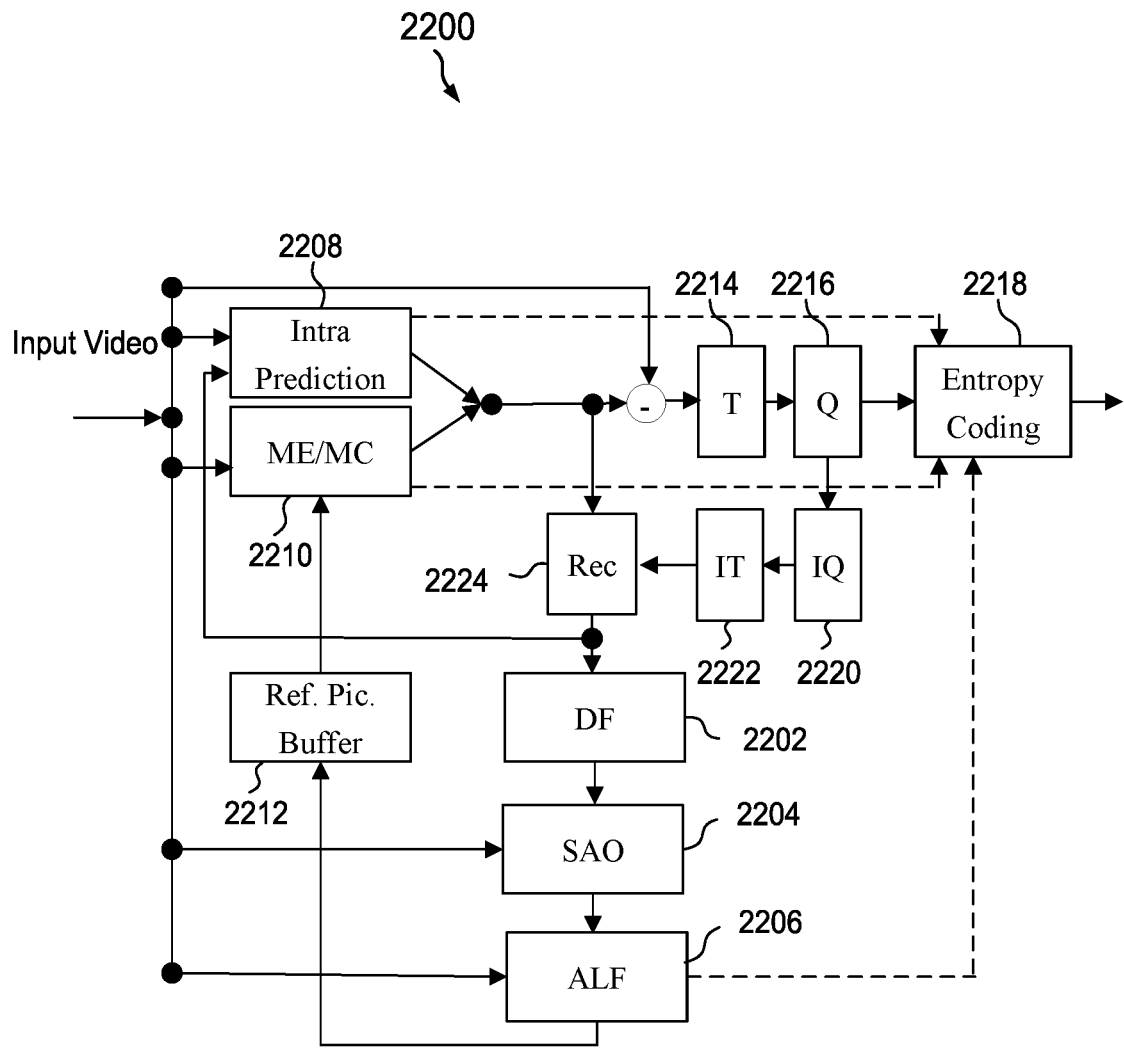
FIG. 22 is a schematic diagram of an example encoder.

It should be noted that the method 1800 can be implemented in an apparatus for processing video data comprising a processor and a non-transitory memory with instructions thereon, such as video encoder 2000, video decoder 2100, and/or encoder 2200 as shown in FIGS. 20, 21, and 22. In such a case, the instructions upon execution by the processor, cause the processor to perform the method 1800. Further, the method 1800 can be performed by a non-transitory computer readable medium comprising a computer program product for use by a video coding device. The computer program product comprises computer executable instructions stored on the non-transitory computer readable medium such that when executed by a processor cause the video coding device to perform the method 1800.

Figure 19:
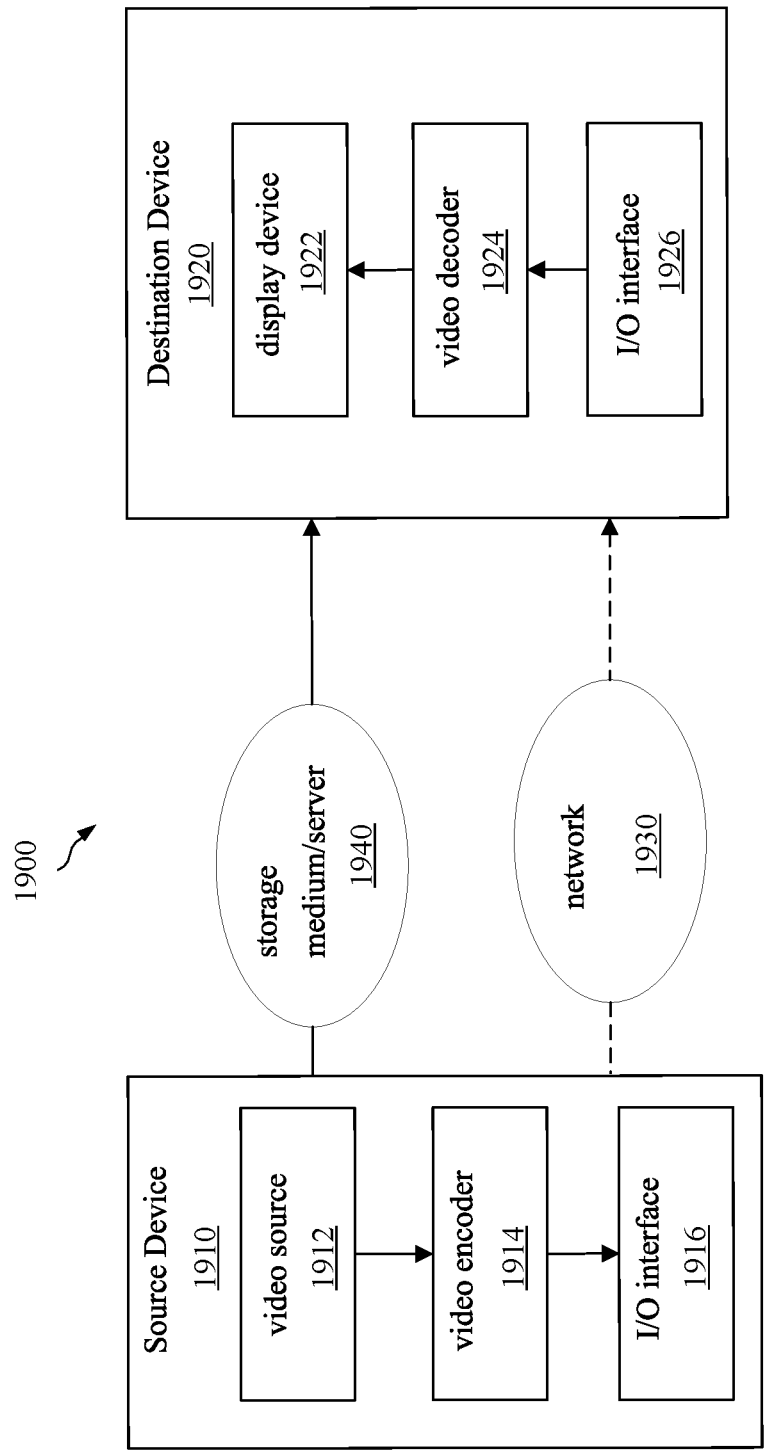
FIG. 19 is a block diagram that illustrates an example video coding system.

FIG. 19 is a block diagram that illustrates an example video coding system 1900 that may utilize the techniques of this disclosure. As shown in FIG. 19, video coding system 1900 may include a source device 1910 and a destination device 1920. Source device 1910 generates encoded video data which may be referred to as a video encoding device. Destination device 1920 may decode the encoded video data generated by source device 1910 which may be referred to as a video decoding device.

Source device 1910 may include a video source 1912, a video encoder 1914, and an input/output (I/O) interface 1916. Video source 1912 may include a source such as a video capture device, an interface to receive video data from a video content provider, and/or a computer graphics system for generating video data, or a combination of such sources. The video data may comprise one or more pictures. Video encoder 1914 encodes the video data from video source 1912 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1916 may include a modulator/demodulator (modem) and/or a transmitter. The encoded video data may be transmitted directly to destination device 1920 via I/O interface 1916 through network 1930. The encoded video data may also be stored onto a storage medium/server 1940 for access by destination device 1920.

Destination device 1920 may include an I/O interface 1926, a video decoder 1924, and a display device 1922. I/O interface 1926 may include a receiver and/or a modem. I/O interface 1926 may acquire encoded video data from the source device 1910 or the storage medium/server 1940. Video decoder 1924 may decode the encoded video data. Display device 1922 may display the decoded video data to a user. Display device 1922 may be integrated with the destination device 1920, or may be external to destination device 1920, which can be configured to interface with an external display device.

Video encoder 1914 and video decoder 1924 may operate according to a video compression standard, such as the High Efficiency Video Coding (HEVC) standard, Versatile Video Coding (VVC) standard and other current and/or further standards.

FIG. 20 is a block diagram illustrating an example of a video encoder 2000, which may be video encoder 1914 in the video coding system 1900 illustrated in FIG. 19. Video encoder 2000 may be configured to perform any or all of the techniques of this disclosure. In the example of FIG. 20, video encoder 2000 includes a plurality of functional components. The techniques described in this disclosure may be shared among the various components of video encoder 2000. In some examples, a processor may be configured to perform any or all of the techniques described in this disclosure.

The functional components of video encoder 2000 may include a partition unit 2001, a prediction unit 2002 which may include a mode selection unit 2003, a motion estimation unit 2004, a motion compensation unit 2005, an intra prediction unit 2006, a residual generation unit 2007, a transform unit 2008, a quantization unit 2009, an inverse quantization unit 2010, an inverse transform unit 2011, a reconstruction unit 2012, a buffer 2013, and an entropy encoding unit 2014.

In other examples, video encoder 2000 may include more, fewer, or different functional components. In an example, prediction unit 2002 may include an intra block copy (IBC) unit. The IBC unit may perform prediction in an MC mode in which at least one reference picture is a picture where the current video block is located.

Furthermore, some components, such as motion estimation unit 2004 and motion compensation unit 2005 may be highly integrated, but are represented in the example of FIG. 20 separately for purposes of explanation.

Partition unit 2001 may partition a picture into one or more video blocks. Video encoder 2000 and video decoder 2100 (FIG. 21) may support various video block sizes.

Mode selection unit 2003 may select one of the coding modes, intra or inter, e.g., based on error results, and provide the resulting intra or inter coded block to a residual generation unit 2007 to generate residual block data and to a reconstruction unit 2012 to reconstruct the encoded block for use as a reference picture. In some examples, mode selection unit 2003 may select a combination of intra and inter prediction (CIIP) mode in which the prediction is based on an inter prediction signal and an intra prediction signal. Mode selection unit 2003 may also select a resolution for a motion vector (e.g., a sub-pixel or integer pixel precision) for the block in the case of inter prediction.

To perform inter prediction on a current video block, motion estimation unit 2004 may generate motion information for the current video block by comparing one or more reference frames from buffer 2013 to the current video block. Motion compensation unit 2005 may determine a predicted video block for the current video block based on the motion information and decoded samples of pictures from buffer 2013 other than the picture associated with the current video block.

Motion estimation unit 2004 and motion compensation unit 2005 may perform different operations for a current video block, for example, depending on whether the current video block is in an I slice, a P slice, or a B slice.

In some examples, motion estimation unit 2004 may perform uni-directional prediction for the current video block, and motion estimation unit 2004 may search reference pictures of list 0 or list 1 for a reference video block for the current video block. Motion estimation unit 2004 may then generate a reference index that indicates the reference picture in list 0 or list 1 that contains the reference video block and a motion vector that indicates a spatial displacement between the current video block and the reference video block. Motion estimation unit 2004 may output the reference index, a prediction direction indicator, and the motion vector as the motion information of the current video block. Motion compensation unit 2005 may generate the predicted video block of the current block based on the reference video block indicated by the motion information of the current video block.

In other examples, motion estimation unit 2004 may perform bi-directional prediction for the current video block, motion estimation unit 2004 may search the reference pictures in list 0 for a reference video block for the current video block and may also search the reference pictures in list 1 for another reference video block for the current video block. Motion estimation unit 2004 may then generate reference indexes that indicate the reference pictures in list 0 and list 1 containing the reference video blocks and motion vectors that indicate spatial displacements between the reference video blocks and the current video block. Motion estimation unit 2004 may output the reference indexes and the motion vectors of the current video block as the motion information of the current video block. Motion compensation unit 2005 may generate the predicted video block of the current video block based on the reference video blocks indicated by the motion information of the current video block.

In some examples, motion estimation unit 2004 may output a full set of motion information for decoding processing of a decoder. In some examples, motion estimation unit 2004 may not output a full set of motion information for the current video block. Rather, motion estimation unit 2004 may signal the motion information of the current video block with reference to the motion information of another video block. For example, motion estimation unit 2004 may determine that the motion information of the current video block is sufficiently similar to the motion information of a neighboring video block.

In one example, motion estimation unit 2004 may indicate, in a syntax structure associated with the current video block, a value that indicates to the video decoder 2100 (FIG. 21) that the current video block has the same motion information as another video block.

In another example, motion estimation unit 2004 may identify, in a syntax structure associated with the current video block, another video block and a motion vector difference (MVD). The motion vector difference indicates a difference between the motion vector of the current video block and the motion vector of the indicated video block. The video decoder 2100 of FIG. 21 may use the motion vector of the indicated video block and the motion vector difference to determine the motion vector of the current video block.

As discussed above, video encoder 2000 may predictively signal the motion vector. Two examples of predictive signaling techniques that may be implemented by video encoder 2000 include advanced motion vector prediction (AMVP) and merge mode signaling.

Intra prediction unit 2006 may perform intra prediction on the current video block. When intra prediction unit 2006 performs intra prediction on the current video block, intra prediction unit 2006 may generate prediction data for the current video block based on decoded samples of other video blocks in the same picture. The prediction data for the current video block may include a predicted video block and various syntax elements.

Residual generation unit 2007 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2007 may not perform the subtracting operation.

Transform unit 2008 may generate one or more transform coefficient video blocks for the current video block by applying one or more transforms to a residual video block associated with the current video block.

After transform unit 2008 generates a transform coefficient video block associated with the current video block, quantization unit 2009 may quantize the transform coefficient video block associated with the current video block based on one or more quantization parameter (QP) values associated with the current video block.

Inverse quantization unit 2010 and inverse transform unit 2011 may apply inverse quantization and inverse transforms to the transform coefficient video block, respectively, to reconstruct a residual video block from the transform coefficient video block. Reconstruction unit 2012 may add the reconstructed residual video block to corresponding samples from one or more predicted video blocks generated by the prediction unit 2002 to produce a reconstructed video block associated with the current block for storage in the buffer 2013.

After reconstruction unit 2012 reconstructs the video block, the loop filtering operation may be performed to reduce video blocking artifacts in the video block.

Entropy encoding unit 2014 may receive data from other functional components of the video encoder 2000. When entropy encoding unit 2014 receives the data, entropy encoding unit 2014 may perform one or more entropy encoding operations to generate entropy encoded data and output a bitstream that includes the entropy encoded data.

FIG. 21 is a block diagram illustrating an example of a video decoder 2100 which may be video decoder 1924 in the video coding system 1900 illustrated in FIG. 19.

The video decoder 2100 may be configured to perform any or all of the techniques of this disclosure. In the example of FIG. 21, the video decoder 2100 includes a plurality of functional components. The techniques described in this disclosure may be shared among the various components of the video decoder 2100. In some examples, a processor may be configured to perform any or all of the techniques described in this disclosure.

In the example of FIG. 21, video decoder 2100 includes an entropy decoding unit 2101, a motion compensation unit 2102, an intra prediction unit 2103, an inverse quantization unit 2104, an inverse transformation unit 2105, a reconstruction unit 2106, and a buffer 2107. Video decoder 2100 may, in some examples, perform a decoding pass generally reciprocal to the encoding pass described with respect to video encoder 2000 (FIG. 20).

Entropy decoding unit 2101 may retrieve an encoded bitstream. The encoded bitstream may include entropy coded video data (e.g., encoded blocks of video data). Entropy decoding unit 2101 may decode the entropy coded video data, and from the entropy decoded video data, motion compensation unit 2102 may determine motion information including motion vectors, motion vector precision, reference picture list indexes, and other motion information. Motion compensation unit 2102 may, for example, determine such information by performing the AMVP and merge mode.

Motion compensation unit 2102 may produce motion compensated blocks, possibly performing interpolation based on interpolation filters. Identifiers for interpolation filters to be used with sub-pixel precision may be included in the syntax elements.

Motion compensation unit 2102 may use interpolation filters as used by video encoder 2000 during encoding of the video block to calculate interpolated values for sub-integer pixels of a reference block. Motion compensation unit 2102 may determine the interpolation filters used by video encoder 2000 (FIG. 20) according to received syntax information and use the interpolation filters to produce predictive blocks.

Motion compensation unit 2102 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 2103 may use intra prediction modes for example received in the bitstream to form a prediction block from spatially adjacent blocks. Inverse quantization unit 2104 inverse quantizes, i.e., de-quantizes, the quantized video block coefficients provided in the bitstream and decoded by entropy decoding unit 2101. Inverse transform unit 2105 applies an inverse transform.

Reconstruction unit 2106 may sum the residual blocks with the corresponding prediction blocks generated by motion compensation unit 2102 or intra prediction unit 2103 to form decoded blocks. If desired, a deblocking filter may also be applied to filter the decoded blocks in order to remove blockiness artifacts. The decoded video blocks are then stored in buffer 2107, which provides reference blocks for subsequent motion compensation/intra prediction and also produces decoded video for presentation on a display device.

FIG. 22 is a schematic diagram of an example encoder 2200. The encoder 2200 is suitable for implementing the techniques of VVC. The encoder 2200 includes three in-loop filters, namely a deblocking filter (DF) 2202, a sample adaptive offset (SAO) filter 2204, and an adaptive loop filter (ALF) 2206. Unlike the DF 2202, which uses predefined filters, the SAO filter 2204 and the ALF 2206 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 2206 is located at the last processing stage of each picture and can be regarded as a tool trying to catch and fix artifacts created by the previous stages.

The encoder 2200 further includes an intra prediction component 2208 and a motion estimation/compensation (ME/MC) component 2210 configured to receive input video. The intra prediction component 2208 is configured to perform intra prediction, while the ME/MC component 2210 is configured to utilize reference pictures obtained from a reference picture buffer 2212 to perform inter prediction. Residual blocks from inter prediction or intra prediction are fed into a transform (T) component 2214 and a quantization (Q) component 2216 to generate quantized residual transform coefficients, which are fed into an entropy coding component 2218. The entropy coding component 2218 entropy codes the prediction results and the quantized transform coefficients and transmits the same toward a video decoder (not shown). Quantization components output from the quantization (Q) component 2216 may be fed into an inverse quantization (IQ) components 2220, an inverse transform (IT) component 2222, and a reconstruction (REC) component 2224. The REC component 2224 is able to output images to the DF 2202, the SAO filter 2204, and the ALF 2206 for filtering prior to those images being stored in the reference picture buffer 2212.

A listing of solutions preferred by some embodiments is provided next.

The following solutions show example embodiments of techniques discussed in the previous section.

1. A video processing method, comprising: determining, for a conversion between a video block of a video and a bitstream of the video, whether or how to apply a partitioning scheme (XT) to the video block according to a rule; and performing the conversion based on the determining; wherein a position of the video block is at a boundary of a video unit; and wherein XT is different from a quadtree (QT) or a binary tree (BT) or a ternary tree (TT) partitioning scheme.

2. The method of solution 1, wherein XT comprises an unsymmetrical binary tree (UBT) partitioning scheme or an Extended Ternary Tree (ETT) partitioning scheme or an unsymmetrical quadtree (UQT) partitioning scheme or an Extended quadtree (EQT) partitioning scheme.

3. The method of any of solutions 1-2, wherein the rule specifies that a portion of the video block outside the boundary is discarded for the conversion due to use of XT for partitioning the video block.

4. The method of solution 1, wherein the rule is based on a location of the video block or the boundary.

5. The method of any of solutions 1-4, wherein the rule is dependent on a dimension of the video block or a dimension of a block obtained by splitting the video block according to XT.

6. The method of solution 1, wherein the rule specifies that XT is disallowed in case that the video block is at a bottom or right or a corner of the video unit.

The following solutions show example embodiments of techniques discussed in the previous section.

7. The method of any of solutions 1-6, wherein the rule specifies that partitioning of the video block using XT is disallowed in case that the video block split from a parent block at the boundary using XT.

8. The method of solution 7, wherein due to XT being disallowed, the rule specifies that indication of how the video block is split is omitted from the bitstream.

9. The method of solution 7, wherein due to XT being disallowed, the rule specifies that the video block is treated as a leaf node of a partitioning tree that includes the video block.

The following solutions show example embodiments of techniques discussed in the previous section.

10. The method of any of solutions 1-9, wherein the rule is further responsive to a height H or a width W or a partitioning depth D of the video block.

11. The method of solution 10, wherein the rule disallows XT in case that H or W satisfy a condition related to a threshold T1 or a threshold T2.

12. The method of solution 10, wherein the rule allows XT in case that H or W satisfy a condition related to a threshold T1 or a threshold T2.

13. The method of solution 10, wherein the rule allows XT in case that D satisfies a condition related to a threshold T.

The following solutions show example embodiments of techniques discussed in the previous section.

14. The method of any of solutions 1-13, wherein the rule is responsive to a coding information of the video block.

15. The method of solution 14, wherein the coding information includes a color format of the video.

16. The method of solution 14, wherein the coding information corresponds to coding information at a sequence level or a slice level or a temporal layer level or a picture level or a block level.

17. The method of solution 14, wherein the coding condition relates to a type of predictive coding used for coding a slice or a picture that includes the video block.

The following solutions show example embodiments of techniques discussed in the previous section.

18. A method of video processing, comprising: performing a conversion between a video block at a boundary of a video unit of a video and a bitstream of the video according to a rule, wherein the rule defines whether or how splitting information for the video block is indicated depending on whether a partitioning scheme, called XT, is enabled for the video block, wherein XT is different from a quadtree (QT) or a binary tree (BT) or a ternary tree (TT) partitioning scheme.

19. The method of solution 18, wherein XT comprises an unsymmetrical binary tree (UBT) partitioning scheme or an Extended Ternary Tree (ETT) partitioning scheme or an unsymmetrical quadtree (UQT) partitioning scheme or an Extended quadtree (EQT) partitioning scheme.

20. The method of any of solutions 18-19, wherein the rule specifies that a syntax element indicative of whether XT is enabled is omitted in case that XT is not enabled for the video block.

The following solutions show example embodiments of techniques discussed in the previous section.

21. The method of any of solutions 1-20, wherein the rule further specifies that information regarding the partitioning scheme for the video block is indicated using a syntax element that is dependent on whether one or more XT are enabled for the video block.

22. The method of solution 1, wherein the rule defines that a binarization of the syntax element is dependent on whether one or more XT are enabled for the video block.

23. The method of any of solutions 1-22, wherein the video block comprises a coding block or a transform block or a prediction block or a coding tree unit.

24. The method of any of solutions 1-23, wherein the video unit comprises a video sequence, a video picture, a video subpicture, a video slice or a virtual pipeline data unit.

25. The method of any of solutions 1-24, wherein the rule is implemented based on a coding condition associated with the video block.

26. The method of any of solutions 1-25, wherein the conversion includes generating the video from the bitstream.

27. The method of any of solutions 1-25, wherein the conversion includes generating the bitstream from the video.

28. A method of storing a bitstream on a computer-readable medium, comprising generating a bitstream according to a method recited in any one or more of solutions 1-26 and storing the bitstream on the computer-readable medium.

29. A computer-readable medium having a bitstream of a video stored thereon, the bitstream, when processed by a processor of a video decoder, causing the video decoder to generate the video, wherein the bitstream is generated according to a method recited in one or more of solutions 1-27.

30. A video decoding apparatus comprising a processor configured to implement a method recited in one or more of solutions 1 to 27.

31. A video encoding apparatus comprising a processor configured to implement a method recited in one or more of solutions 1 to 27.

32. A computer program product having computer code stored thereon, the code, when executed by a processor, causes the processor to implement a method recited in any of solutions 1 to 27.

33. A computer readable medium on which a bitstream complying to a bitstream format that is generated according to any of solutions 1 to 27.

34. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
   determining, for a conversion between a video unit of a video and a bitstream of the video, an application of a partitioning scheme to a video block positioned at a boundary of the video unit according to a rule; and
   performing the conversion based on the application of the partitioning scheme,
   wherein the rule specifies whether the partitioning scheme is allowed to be used on the video block at the boundary is based on at least one of a dimension of the video block or a dimension of a sub-block of the video block, and wherein the sub-block of the video block is partitioned from the video block.

2. The method of claim 1, wherein when the application of the partitioning scheme to the video unit results in at least a portion of the video block being positioned outside the boundary of the video unit, wherein the rule specifies that the portion of the video block positioned outside the boundary of the video unit is to be discarded, and
   wherein the portion of the video block positioned outside the boundary of the video unit is discarded after applying the partitioning scheme to the video unit.

3. The method of claim 1, wherein the rule specifies whether the partitioning scheme is allowed to be used on the video block at the boundary is based on at least one of a location of the video block or a location of the boundary.

4. The method of claim 1, wherein the rule specifies that the partitioning scheme is allowed to be used to partition the video block when the application of the partitioning scheme to the video block results in a plurality of sub-blocks, wherein a first subset of the plurality of sub-blocks are outside the boundary of the video unit,
   wherein the rule specifies that a horizontal partitioning scheme is allowed to be used to partition the video block when the boundary is at least one of a bottom boundary or a corner boundary of the video unit and when the application of the horizontal partitioning scheme to the video block results in the plurality of sub-blocks, wherein a sum of heights of a second subset of the plurality of sub-blocks within the boundary of the video unit is equal to a difference between a height of the video unit and a y-coordinate of the video block,
   wherein the rule specifies that a vertical partitioning scheme is allowed to be used to partition the video block when the boundary is at least one of a right boundary or the corner boundary of the video unit and when the application of the vertical partitioning scheme to the video block results in the plurality of sub-blocks, wherein a sum of widths of the second subset of the plurality of sub-blocks within the boundary of the video unit is equal to a difference between a width of the video unit and an x-coordinate of the video block,
   wherein the rule specifies that the horizontal partitioning scheme is allowed to be used to partition the video block when the video block is at the corner boundary of the video unit and when the application of the horizontal partitioning scheme to the video block results in the plurality of sub-blocks, wherein the sum of heights of the second subset of the plurality of sub-blocks within the boundary of the video unit is equal to the difference between the height of the video unit and the y-coordinate of the video block,
   wherein the rule specifies that the vertical partitioning scheme is allowed to be used to partition the video block when the video block is at the corner boundary of the video unit and when the application of the vertical partitioning scheme to the video block results in the plurality of sub-blocks, wherein the sum of widths of the second subset of the plurality of sub-blocks within the boundary of the video unit is equal to the difference between a width of the video unit and the x-coordinate of the video block, or wherein the rule specifies that the partitioning scheme is disallowed to be used to partition the video block when the boundary is at least one of the bottom boundary, the right boundary or the corner boundary of the video unit.

5. The method of claim 1, wherein the application of the partitioning scheme to the video block results in a first sub-block, wherein the first sub-block is disallowed to be further split, and an indication of split methods is not signalled for the first sub-block and the first sub-block is treated as a leaf node.

6. The method of claim 1, wherein the rule specifies whether the partitioning scheme is allowed to be used on the video block at the boundary is based on a comparison between a threshold and at least one of a width of the video block, a height of the video block, or a depth of the video block, wherein the threshold is based on at least one of a color component of the video block, a slice type of the video block, a picture type of the video block, a luma coding tree of the video block, or a chroma coding tree of the video block; or the threshold is signaled in the bitstream.

7. The method of claim 1, wherein partitioning scheme is one of Unsymmetric Binary Tree (UBT) partitioning, Extended Ternary-Tree (ETT) partitioning, Unsymmetrical Quad-Tree (UQT) partitioning or Extended Quad Tree (EQT) partitioning.

8. The method of claim 1, wherein the rule specifies whether the partitioning scheme is allowed to be used on the video block at the boundary is based on coding information of the video block, wherein the coding information comprises at least one of a color format of the video block, a color component of the video block, or a slice type of the video block, and wherein the rule is further based on whether a luma coding tree and a chroma coding tree of the video block are separated.

9. The method of claim 1, wherein an indication of the partitioning scheme applied on the video block is signaled in the bitstream.

10. The method of claim 1, wherein splitting information for the video block at the boundary is signaled based on whether the partitioning scheme is allowed to be used on the video block.

11. The method of claim 10, wherein when the partitioning scheme is disallowed to be used on the video block, a syntax element indicating whether the partitioning scheme is applied on the video block is not signaled in the bitstream.

12. The method of claim 10, wherein splitting information for the video block at the boundary is not signaled in the bitstream when only the partitioning scheme is allowed to be used to the video block at the boundary.

13. The method of claim 1, wherein when a horizontal partitioning scheme is disallowed to be used on the video block, a first syntax element indicating whether the horizontal partitioning scheme is applied on the video block is not signaled in the bitstream; and wherein when a vertical partitioning scheme is disallowed to be used on the video block, a second syntax element indicating whether the vertical partitioning scheme is applied on the video block is not signaled in the bitstream.

14. The method of claim 1, wherein a binarization of syntax elements related to splitting information for the video block at the boundary and/or context selection for the syntax elements is based on whether the partitioning scheme is allowed to be used on the video block.

15. The method of claim 1, wherein the conversion includes encoding the video unit into the bitstream.

16. The method of claim 1, wherein the conversion includes decoding the video unit from the bitstream.

17. An apparatus for processing video data, comprising: a processor; and a non-transitory memory with instructions thereon, wherein the instructions upon execution by the processor, cause the processor to:

determine, for a conversion between a video unit of a video and a bitstream of the video, an application of a partitioning scheme to a video block positioned at a boundary of the video unit according to a rule; and perform the conversion based on the application of the partitioning scheme, wherein the rule specifies whether the partitioning scheme is allowed to be used on the video block at the boundary is based on at least one of a dimension of the video block or a dimension of a sub-block of the video block, and wherein the sub-block of the video block is partitioned from the video block.

18. The apparatus of claim 17, wherein when the application of the partitioning scheme to the video unit results in at least a portion of the video block being positioned outside the boundary of the video unit, the rule specifies that the portion of the video block positioned outside the boundary of the video unit is to be discarded, and wherein the portion of the video block positioned outside the boundary of the video unit is discarded after applying the partitioning scheme to the video unit.

19. The apparatus of claim 17, wherein the rule specifies whether the partitioning scheme is allowed to be used on the video block at the boundary is based on at least one of a location of the video block or a location of the boundary.

20. A method for storing a bitstream of a video, comprising:

determining, for a video unit of the video, an application of a partitioning scheme to a video block positioned at a boundary of the video unit according to a rule;

generating the bitstream of the video based on the application of the partitioning scheme; and storing the bitstream in a non-transitory computer-readable recording medium, wherein the rule specifies whether the partitioning scheme is allowed to be used on the video block at the boundary is based on at least one of a dimension of the video block or a dimension of a sub-block of the video block, and wherein the sub-block of the video block is partitioned from the video block.

* * * * *